(12) United States Patent
Hsiao et al.

(10) Patent No.: US 6,261,675 B1
(45) Date of Patent: Jul. 17, 2001

(54) CORE-CRUSH RESISTANT FABRIC AND PREPREG FOR FIBER REINFORCED COMPOSITE SANDWICH STRUCTURES

(75) Inventors: Hao-Ming Hsiao, San Ramon; Shaw Ming Lee, Danville; Robert Albert Buyny, Clayton; Cary Joseph Martin, Dublin, all of CA (US)

(73) Assignee: Hexcel Corporation, Pleasanton, CA (US)

( * ) Notice: Subject to any disclaimer, the term of this patent is extended or adjusted under 35 U.S.C. 154(b) by 0 days.

(21) Appl. No.: 09/273,637

(22) Filed: Mar. 23, 1999

(51) Int. Cl.$^7$ .......................................... B32B 5/02

(52) U.S. Cl. ..................... 428/219; 428/220; 442/179; 442/208; 442/195

(58) Field of Search ................................. 442/179, 195, 442/208; 428/219, 220

(56) References Cited

U.S. PATENT DOCUMENTS

| | | |
|---|---|---|
| 3,859,158 | 1/1975 | Park . |
| 4,213,930 | 7/1980 | Goodrich et al. . |
| 4,284,443 | 8/1981 | Hilton . |
| 4,390,584 | 6/1983 | Briens . |
| 4,427,802 | 1/1984 | Moulton et al. . |
| 4,445,956 | 5/1984 | Freeman et al. . |
| 4,504,346 | 3/1985 | Newsam . |
| 4,563,385 | 1/1986 | Bhatt et al. . |
| 4,599,413 | 7/1986 | Moulton et al. . |
| 4,622,091 | 11/1986 | Letterman . |
| 4,671,841 | 6/1987 | Stephens . |
| 4,680,216 | 7/1987 | Jacaruso . |
| 4,826,106 | 5/1989 | Anderson . |
| 4,833,029 | 5/1989 | DuPont et al. . |
| 4,910,065 | 3/1990 | McKinney . |
| 5,242,651 | 9/1993 | Brayden et al. . |
| 5,354,195 | 10/1994 | Dublinski et al. . |
| 5,443,884 | 8/1995 | Lusignea et al. . |
| 5,447,785 | 9/1995 | Kishi et al. . |

(List continued on next page.)

FOREIGN PATENT DOCUMENTS

| | | |
|---|---|---|
| 0 439 197 | 7/1991 | (EP) . |
| 0 819 723 | 1/1998 | (EP) . |
| 1 001 063 | 5/2000 | (EP) . |
| 63-168438 | 12/1986 | (JP) . |
| 4-294136 | 10/1992 | (JP) . |
| 6-901 | 1/1994 | (JP) . |
| WO 99/61233 | 12/1999 | (WO) . |

OTHER PUBLICATIONS

Tow Collapse Model for Compression Strength of Textile Composites, T.C. Emehel et al., Journal of Reinforced Plastics and Composites, vol. 16, No. 1, 1997, pp. 86–101.

(List continued on next page.)

Primary Examiner—Elizabeth M Cole
(74) Attorney, Agent, or Firm—Alston & Bird LLP

(57) ABSTRACT

A core crush resistant prepreg for use in making a fiber reinforced composite panel structure is provided. The prepreg comprises a woven fabric consisting essentially of carbon fiber tow strands impregnated with a hardenable polymeric resin composition. Typically the fabric has an areal weight of from about 180 to about 205 grams per square meter. The prepreg has an average fiber tow aspect ratio of less than about 15.4, a prepreg thickness of at least about 0.245 mm, and a prepreg openness of at least about 1.2 percent but less than about 6.0 percent. Preferably, the resin composition is predominantly viscous in nature and has a tan δ value of between 0.9 and 2.0 at an elevated temperature between 70° C. and 140° C., and an average epoxy functionality of greater than 2.0. A method for evaluating core crush resistance properties of a prepreg is also provided. The method includes determining a fiber tow average aspect ratio of the prepreg, determining a prepreg thickness, and comparing said average fiber tow aspect ratio and prepreg thickness to a set of predetermined values.

51 Claims, 7 Drawing Sheets

U.S. PATENT DOCUMENTS

| | | |
|---|---|---|
| 5,484,642 | 1/1996 | Bompard et al. . |
| 5,490,892 | 2/1996 | Castagnos et al. . |
| 5,527,414 | 6/1996 | Dublinski et al. . |
| 5,589,016 | 12/1996 | Hoopingarner et al. . |
| 5,604,010 | 2/1997 | Hartz et al. . |
| 5,616,405 | 4/1997 | Kishi et al. . |
| 5,626,916 | 5/1997 | Kishi et al. . |
| 5,636,013 | 6/1997 | Boi . |
| 5,662,990 | 9/1997 | Scari et al. . |
| 5,685,940 | 11/1997 | Hopkins et al. . |
| 5,688,353 | 11/1997 | Dublinski et al. . |
| 5,773,370 | 6/1998 | Dunbar et al. . |
| 5,792,713 | 8/1998 | Scari et al. . |
| 5,807,793 | 9/1998 | Scari et al. . |
| 5,817,409 | 10/1998 | Stephan et al. . |
| 5,837,624 | 11/1998 | Sakaguchi et al. . |

OTHER PUBLICATIONS

The Effect of Defects on the Strength of Composite Sandwich Assemblies, G. V. Glinecki et al., 27th National SAMPE Symposium, May 1982, pp. 509–518.

Using Optical Sensors to Understand Core Crush in Composite Panels During Processing, N. Zahlan et al., presented at Third International Conference on Intelligent Materials, Third European Conference on Smart Structures and Materials, Lyon, Jun. 1996, SPIE vol. 2779, pp. 235–238.

Frictional Resistance of Thermoset Prepregs and Its Influence on Honeycomb Composite Processing, C.J. Martin et al., Composites Part A 27A, 1996, pp. 943–951.

Effect of Impregnation Conditions on Prepreg Properties and Honeycomb Core Crush, C.J. Martin et al., Polymer Composites, Feb. 1997, vol. 18, No. 1, pp. 90–99.

Experimental Analysis of Core Crushing and Core Movement in RTM and SRIM Foam Cored Composite Parts, S. Wirth et al., Journal of Reinforced Plastics and Composites, vol. 17, No. 11, 1998, pp. 964–989.

Composite Honeycomb Core Crush in Relation to Internal Pressure Measurement, D.J. Renn et al., Journal of Advanced Materials, Oct., 1995, pp. 31–40.

F593™ Resin Systems for Advance Composites, Product Data, Hexcel Composite Materials, 12/98.

Effect of Prepreg Resin Composition on Honeycomb Core Crush, C.J. Martin et al., 43rd International SAMPE Symposium, May–Jun. 1998, pp. 366–375.

CORE-CRUSH RESISTANT FABRIC AND PREPREG FOR FIBER REINFORCED COMPOSITE SANDWICH STRUCTURES

FIELD OF THE INVENTION

The invention relates to composite sandwich structures, preferably honeycomb core, composite sandwich structures, and to fabric and prepreg components for such composite structures. More particularly, the invention relates to core crush resistant, honeycomb core composite sandwich structures, particularly those composite structures used in the aerospace industry, and to fabrics and prepregs for making such composite sandwich structures.

BACKGROUND OF THE INVENTION

Honeycomb core composite sandwich structures find widespread use in the aerospace industry as panel components in various aerospace structures. The honeycomb core composites are formed from a lay-up of prepreg skin plies encompassing a honeycomb core, the latter typically having beveled edges. The prepreg plies may be fabrics, tapes, or non-wovens that have been pre-impregnated with a thermosetting, thermoplastic or other polymeric resin. The fabrics used to form the prepregs are woven fabrics, formed primarily or entirely of high modulus, reinforcing fibers in the form of continuous filament tows. Curing of the lay-up is carried out in a high temperature, high pressure environment, typically in an autoclave.

The technical requirements of aerospace end uses generally dictate that the prepregs and prepreg components meet a rigid set of chemical, physical, and mechanical specifications including overall prepreg basis weight, fiber modulus, and resin flow rate. The basis weight of the prepreg and the high strength properties of the fibers and the resin, in combination with the strength properties of the honeycomb core component, impart high strength-to-weight, and high stiffniess-to-weight ratios to the fmal composite structure. In addition, the flow rate characteristics of the resin and the high pressures used to cure the composite, minimize porosity, i.e., the inclusion of voids and through holes, that might impair strength, the desired impervious nature, and/or surface smoothness of the final honeycomb panel sandwich structure.

Even though honeycomb core composite panels have long been used in the aerospace industry, manufacture of these structures is still plagued by high reject scrap levels, generating substantial quantities of unusable scrap and impacting negatively on manufacturing economics. Partial collapse of the honeycomb core during curing of the composite, known in the industry as "core crush", is a particularly common reason for rejection of cured panels. Core crush is typically observed in the beveled edge or chamfer region of the honeycomb structural part.

Substantial effort and research extending over many years have been directed to the core crush problem. For example, U.S. Pat. No. 5,685,940 to Hopkins discloses an improved tiedown method to produce or prevent core crush and ply wrinkling in honeycomb sandwich structures. A scrim-supported barrier film is placed between the fiber-reinforced resin composite laminates and honeycomb core to prevent resin flow from the prepreg into the honeycomb core. A tiedown ply between the core and the barrier film is used to reduce slippage of the barrier film relative to the core during curing. In addition, a film adhesive having a curing temperature lower than that of the laminate resin is placed between the tiedown plies just outside the net trim line. During the curing process, cured film adhesive bonds the tiedown plies to one another before the curing of the prepreg laminates, thus strengthening the tiedown and reducing core crush. The Hopkins patent also discusses other methods and structural modifications which have been proposed for minimizing or eliminating the core crush. Nevertheless, core crush remains a significant problem in the industry.

SUMMARY OF THE INVENTION

The present invention provides a core crush resistant prepreg for use in making a fiber reinforced composite sandwich structure. Use of the prepreg of this invention, can significantly reduce the degree of core crush as compared to conventional structures.

In accordance with a first aspect of the invention, it has been found that the core crush problem associated with honeycomb core composite sandwich structures can be significantly reduced by controlling construction of the fabric used to prepare the prepreg. In particular, it has been found that core crush can be substantially reduced by controlling the cross sectional aspect ratio of the carbon fiber tow in the prepreg, the average thickness of the prepreg and the openness of the prepreg, as measured by visual inspection. In particular, prepregs according to the invention are made from fabrics having an areal weight range of from about 150 to 400 grams per square meter. The prepreg has an average tow aspect ratio of less than about 15.5, an average prepreg thickness of at least about 0.245mm, and/or an openness of at least about 1.2% but less than about 10.0%.

While not wishing to be bound by theory, it is believed that average tow aspect ratio, prepreg openness and prepreg thickness determine the frictional force between prepreg plies during the curing step in the manufacture of honeycomb core composite sandwich structures. When prepreg properties of tow aspect ratio, prepreg thickness and prepreg openness are maintained within the ranges set forth above, sufficient frictional force is provided between prepreg plies such that the innermost prepreg plies, adjacent the honeycomb core, are restrained from slipping during the curing process to thereby eliminate or minimize core crush.

It has also been found, according to the present invention, that when the tow aspect ratio, prepreg thickness and prepreg openness are optimized to minimize core crush, the porosity of the final honeycomb core composite sandwich structure can be unacceptable. The porosity problems can be especially prevalent in thicker composite sandwich structures and especially when a low flow resin system is used to impregnate the prepreg. The present invention employs a hardenable polymeric resin composition having a flow rate higher than the flow rate of resins traditionally used in commercial practice in the aerospace industry in prepregs for honeycomb core composite sandwich structures in order to maintain acceptable porosity in the final composite structure. Therefore, prepregs according to the present invention are impregnated with a hardenable polymeric resin composition having rheology which is predominately viscous in nature, such that the ratio of viscous to elastic components of the viscosity, i.e., tan $\delta$, is within the following defined ranges.

Prior to significant resin cross-linking or curing, the resin composition used in this invention preferably has a tan $\delta$ of between about 1.2 and about 2.0, preferably between about 1.5 and about 1.8, more preferably about 1.35, at 70° C.; or, a tan $\delta$ of between about 0.7 and about 2.0, preferably between about 0.9 and about 1.8, more preferably about 1.35, at 100° C.; or, a tan δ of between about 0.5 and about 1.7, preferably between about 0.7 and about 1.5, more preferably about 1.35, at 140° C.

Preferably, the tan δ of the resin composition is from about 0.5 to about 2.0, more preferably between about 1.0 and about 1.8, most preferably about 1.35, throughout the elevated temperature range of from about 70° C. to about 140° C., or if the minimum viscosity temperature is below 140° C., the range of from about 70° C. to the minimum viscosity temperature.

More preferably, prior to significant resin cross-linking or curing, the resin composition has a tan δ of between about 1.0 and about 2.0, more preferably between about 1.2 and about 1.8 at about 70° C.; between about 0.7 and about 2.0, more preferably between about 1.0 and about 1.7 at about 100° C.; and, between about 0.5 and about 2.0, more preferably between about 0.6 and about 1.7 at about 140° C., or at the minimum viscosity temperature, if the minimum viscosity temperature is below 140° C.

Preferably, the resin composition comprises an epoxy resin and has an average epoxy fiuctionality of greater than 2.0.

According to another aspect of the invention, a prepreg for attaining good core crush performance while minimizing porosity in honeycomb core composite sandwich structures is provided having different tow aspect ratios in the warp and weft directions. In particular, prior art prepregs have been prepared using identical carbon fiber tows as warp and weft components. In accordance with this aspect of the invention, it has been found that different carbon fiber tow constructions provide different tow cross-sectional aspect ratios. By using different tows to form the warp and weft components of the fabric component of the prepreg, it is possible to optimize and balance the frictional properties of the prepreg, thus minimizing the core crush properties of the prepreg, while also minimizing any substantial porosity increase in the final composite structure. In accordance with this aspect of the invention, the prepreg is formed from different carbon fiber tows in the warp and weft directions. The prepreg has a tow aspect ratio of no greater than about 13.0 in one of the warp and weft directions and a tow aspect ratio of at least about 13.5 in the other of the warp and weft directions. In addition, the prepreg has an openness of no greater than about 5.0%. Preferably the prepreg has a prepreg thickness of from about 0.250 mm to about 0.275 mm. Prepregs according to this aspect of the invention, i.e., fabrics having hybrid tow aspect ratios, are well suited for use with a wide variety of resins systems, e.g. of varying rheologies.

In accordance with yet another embodiment of the present invention, there is provided a prepreg which comprises in the resin-impregnated fabric, tow strands having a predetermined substantially stable, non-round cross sectional shape. Preferably, such tow strands have an average fiber tow aspect ratio of from about 12.0 to about 14.5, and a prepreg openness of no great than about 5.0%. It has been discovered that such prepregs can substantially reduce both core crush and porosity in fiber reinforced composite structures.

Thus, the prepregs of the present invention are capable of substantially reducing core crush and porosity in honeycomb core composite structures. However, no complexities are added to the lay-up and/or curing process for preparing the panels. Moreover, the present invention does not introduce abnormal or unusual components into the composite structure. Thus, the present invention can provide substantially reduced core crush and substantially reduced reject levels without requiring substantial modification to the conventional procedures and/or lay-up arrangement used to prepare honeycomb core composite sandwich structures. In addition, because various fiber tows can be manipulated in accordance with the present invention to impart desirable prepreg properties so as to reduce core crush, this invention allows prepreg manufacturers greater freedom in selecting fiber tows or fabrics for use in preparing prepregs, and thus less dependence on specific specialty fiber tow manufacturers.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
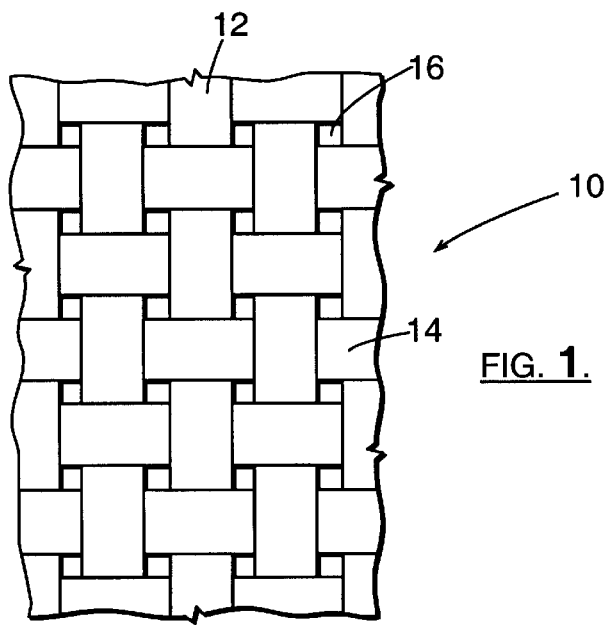
FIG. 1 illustrates a woven fabric for use in the prepreg of this invention.

Illustrated in FIG. 1 is a woven fabric 10 that can be used to prepare the prepreg of this invention. Although other conventional fabrics such as knitted fabric and nonwoven fabric can be used, a woven fabric is preferred. Furthermore, a variety of tow orientations, e.g., ±45°, 0°/90°, etc., may be used to weave suitable fabrics for the present invention. Typically, a two-dimensional biaxially woven fabric is preferred. The woven fabric 10 has a plurality of warp tow strands 12 interweaving with a plurality of weft tow strands 14. The term "tow" and "tow strand" are used herein interchangeably to refer to the yarn used to form a woven fabric. As will be apparent from the description below, each tow or tow strand is essentially a bundle of a plurality of fiber filaments. As used herein, "warp" and "weft" are used herein to refer to the two different directions in which the tow strands are oriented in a two-dimensional woven fabric. Although in the textile art, warp tows typically are referred to yarns that run parallel to the selvage or longer dimension of a fabric, the term "warp" as used herein can mean either of the two directions, and "weft" the other direction.

As illustrated in fabric 10, a plurality of openings 16 are formed by the interweaving warp tow strands 12 and weft tow strands 14. Typically, the openings 16 are square or rectangular openings, i.e., the warps and wefts cross at a substantially right angle. Although other fabric patterns such as basket weave, crow foot satin weave, leno weave, mock leno weave, or unidirectional weave can be used, satin weave, twill weave, and plain weave are most preferred for the prepreg of the present invention. As is well known in the art, in a plain weave pattern as illustrated in FIG. 1, each weft tow passes successively over and under each single warp yarn in alternating rows. In a satin weave pattern, warp tow strands outnumber the weft tow strands, and are characterized by floats that run in the warp direction on the face in such a manner as to reflect light, producing gloss, luster, or shine. Typically, each weft tow floats over two or more warp tows. In twill weaves, tows are interlaced and dominant diagonally lined patterns are created. Typically, a series of floats are staggered in a definite pattern in the warp direction, either to the left (left-hand twill), to the right (right-hand twill), or equally to the left and right in a zigzag effect (broken twill), which produces no diagonal lines.

Each tow strand 12 and 14 is formed from a plurality of continuous filaments as will be apparent. The term "filament" and "fiber" are used herein interchangeably to mean an individual fiber or filament of the multi-fiber or multi-filament tow. Various different high modulus reinforcing fibers can be used to form the tows such as carbon fibers, fiberglass, or aramid. Preferably, carbon fibers are utilized. This is because generally they have desirable properties of high tensile strength, high modulus, and low density and good resistance to adverse environmental factors such as high temperature, high moisture and high acidity. As is known in the art, carbon fibers are generally made by converting various precursor organic polymeric fibrous materials to a carbonaceous form under high temperature while retaining the original fibrous configuration essentially intact except that the fiber cross sectional size is normally decreased and/or the fiber cross-sectional shape can be changed because of stretching during carbonization processing. Generally, for purposes of this invention, carbonization can be conducted either before or after the precursor filaments are bundled together to form a tow.

As used herein, "carbon" fibers or "carbonaceous" fibers generally refer to graphite fibers and amorphous carbon fibers. Graphite fibers consist essentially of carbon and have a predominate x-ray diffraction pattern characteristic of graphite. Amorphous carbon fibers ordinarily refer to fibers consisting essentially of carbon and exhibiting an essentially amorphous x-ray diffraction pattern.

The carbon fibers typically used for the tow strands are structural textile fibers and have a standard tensile modulus, or Young's modulus of above about $10\times10^6$ psi, e.g., from about $10\times10^6$ psi to about $120\times10^6$ psi, preferably from about $20\times10^6$ psi to about $100\times10^6$ psi, more preferably from about $25\times10^6$ psi to about $75\times10^6$ psi, and most preferably from about $30\times10^6$ psi to about $45\times10^6$ psi. Suitable carbon fibers should have an individual denier of from about 0.2 to about 1.0 g/9000 m, preferably from about 0.3 to about 0.8 g/9000 m, more preferably from about 0.4 to about 0.7 g/9000 m, and most preferably from about 0.55 to about 0.65 g/9000 m. The diameter of each single carbon fiber filament can be in the range of from about 0.5 to about 50 $\mu$m, preferably from about 1 to about 25 $\mu$m, more preferably from about 5 to about 15 $\mu$m, and most preferably about 10 $\mu$m.

Each carbon fiber tow strand can have a total filament count of from about 1,000 to about 80,000, preferably from about 2,000 to about 50,000, more preferably from about 3000 to about 18,000, and most preferably 3,000 to about 12,000. For example, a typical filament count of a fiber tow strand can be 3,000, 6,000, 12,000, from about 1,000 to less than about 3,000, or can be greater than 3,000 but no greater than 18,000. Typically, the fabric used in the prepreg of this invention should have an areal weight of from about 150 to about 400 grams per square meter, preferably from about 160 to about 250 grams per square meter, more preferably from about 180 to 205 grams per square meter, and most preferably from about 185 to about 201 grams per square meter. As apparent to a skilled artisan, a fabric with an areal weight within these ranges is particularly suitable in making fiber reinforced composite structures for aviation end uses.

In order to make the prepreg of the present invention, the fabric as described above is impregnated with a polymeric matrix resin composition. Generally any resin compositions used in the art for impregnating prepregs used for making fiber reinforced composite structures can be suitably used in the present invention. For example, such suitable resin compositions are disclosed in e.g. U.S. Pat. No. 4,599,413 to Moulton et al., U.S. Pat. No. 5,626,916 to Kishi et al., and European Patent Application EP 0819723 A1 to Kishi et al., each of which are incorporated herein by reference.

Typically, a suitable resin composition comprises from about 40% to about 95% by weight of polymeric matrix resin, from about 5% to about 40% by weight of curing agent, and from about 0% to about 20% by weight of a flow control agent. Many different polymeric matrix resins known in the art can be used in the present invention. Examples of suitable polymeric matrix resin include, but are not limited to, epoxy resins, phenolic resins, polyester resins, polyimide resins, polybenzimidazoles, polyurethanes, vinyl ester resins, bismaleimide resins, polyetherimide, polyetherketone, polyamides, etc. Polymeric matrix resins are processed in a variety of ways such as hardening a liquid, melting, foaming, and solvent activation. However, a thermosetting epoxy resin is most preferred, especially epoxy resins derived from amines, phenols or vinyl compounds. As is known in the art, epoxy resins utilize epoxide groups as the finctional groups in the curing reaction. Suitable thermosetting epoxy resins may include, but are not limited to, diglycidyl-p-aminophenol, triglycidyl aminocresol, triglycidyl-p-aminophenol, tetraglycidyl diaminodiphenylmethane, tetraglycidyl ethers of methylenedianiline, bisphenol A type epoxy resins such as diglycidyl ethers of bisphenol A, bisphenol F type epoxy resins such as diglycidyl ethers of bisphenol F, bisphenol S type epoxy resins, phenol novolac type epoxy resins, cresol novolac type epoxy resins, resorcinol type epoxy resins, epoxy resins with a naphthalene skeleton, biphenyl type epoxy resins, dicyclopentadiene type epoxy resins and diphenylfluorene type epoxy resins, etc. These resins can be used individually or in any appropriate combinations. Preferred epoxy resins are those having an epoxy functionality of at least 2.0, more preferably greater than 2, because of the technical demands imposed by aerospace end uses. In other words, bifunctional, trifunctional, or higher functional epoxy resin are preferred. In particular, glycidylamine type epoxy resin and glycidyl ether type epoxy resin having a functionality of greater than 2 are preferred.

Curing agents are those compounds having an active group that can react with a functional group in the polymeric resin, for example, an epoxy group of an epoxy resin. Suitable curing agents for epoxy resins include, but are not limited to, diaminodiphenyl methane, diaminodiphenylsulfone, various substituted ureas, aminobenzoates, various acid anhydrides, various isomers of dicyandiamide, phenol novolac resins, cresol novolac resins, polyphenol compounds, imidazole derivatives, alphatic amines, tetramethylguanidine, carboxylic anhydrides, carboxylic acid hydrazides, carboxylic acid amides, polymercaptan, Lewis acid complexes such as a boron trifluoride ethylamine complex, and the various heterocyclic multifunctional amine adducts as disclosed in the aforesaid U.S. Pat. Nos. 4,427,802 and 4,599,413. Any of the above curing agents can be used either individually or in various combinations in the resin composition of the present invention.

As is well known in the art, flow control agents in a resin composition are used to adjust the viscoelasticity of the resin composition. The flow control agents used in the present invention are also often utilized with resin compositions to modify the mechanical performance of the cured composite article, e.g., by providing toughness. Suitable flow control agents may include, but are limited to, e.g., solid rubbers, liquid rubbers, thermoplastic resin elastomers, organic and inorganic particles, and short fibers. Certain thermoplastics that are soluble or partially soluble in epoxy resins may also be used as flow control agents. Such thermoplastics include, e.g., polysulfones, polyether sulfones, polyether imides, and polyethylene oxide. The various flow control agents can be used individually or in combinations.

Typically, both a liquid rubber or elastomer and a solid rubber or elastomer, which are fully or partially soluble in the epoxy resins are included. As is known in the art, when solid rubbers are used in an epoxy resin composition, the temperature dependence of the viscoelasticity function of the resin composition is decreased and the surface smoothness of the skin panel in the cured fiber reinforced composite sandwich structure is increased. Preferably, the solid rubber and/or liquid rubber included in the resin composition includes one or more functional groups such as carboxyl groups and amino groups, which react with the epoxy groups of an epoxy resin in the resin composition. Examples of preferred solid rubbers include, e.g., solid acrylonitrile-butadiene rubber, hydrogenated nitrile rubber, etc. Various other solid and liquid elastomers known in the art can all be used.

Particulate flow control agents that are included in the resin composition may also function as fillers or extenders. Examples of such an agents include, e.g., fumed silica, mica, calcium carbonate, calcium phosphate, glass, metal oxides, cellulose, starch, clays, diatomaceous earth, etc.

Other materials such as catalysts, antioxidants, chain extenders, reactive diluents, and the like all of which are known in the art, can also be optionally included. Although any resin composition as described above can be useful in the present invention, it is preferred however to employ an epoxy resin composition which exhibits significant viscous flow that is higher than that of some of the conventional resins used in prior art prepregs used for preparing composite structures for aviation uses. In particular, it is preferred to use an epoxy resin composition wherein the elastic and viscous components of the composition are of similar magnitudes. For example, the preferred epoxy resin composition should have a tan $\delta$ that falls within the following defined ranges, prior to significant resin cross-linking or curing:

The resin composition used in this invention preferably has a tan $\delta$ of between about 1.2 and about 2.0, preferably between about 1.5 and about 1.8, more preferably about 1.35, at 70° C.; or, a tan $\delta$ of between about 0.7 and about 2.0, preferably between about 0.9 and about 1.8, more preferably about 1.35, at 100IC; or, a tan $\delta$ of between about 0.5 and about 1.7, preferably between about 0.7 and about 1.5, more preferably about 1.35, at 140° C.

Preferably, the tan $\delta$ of the resin composition is from about 0.5 to about 2.0, more preferably between about 1.0 and about 1.8, most preferably about 1.35, throughout the elevated temperature range of from about 70° C. to about 140° C., or if the minimum viscosity temperature is below 140° C., the range of from about 70° C. to the minimum viscosity temperature.

More preferably, prior to significant resin cross-linking or curing, the resin composition has a tan $\delta$ of between about 1.0 and about 2.0, more preferably between about 1.2 and about 1.8 at about 70° C.; between about 0.7 and about 2.0, more preferably between about 1.0 and about 1.7 at about 100° C.; and, between about 0.5 and about 2.0, more preferably between about 0.6 and about 1.7 at about 140° C., or at the minimum viscosity temperature, if the minimum viscosity temperature is below 140° C.

Typically, the preferred resin composition used herein can have a minimum complex viscosity of 100 to 50,000 centipoise when heated at the typical processing rates used in the industry (0.5–5° C./min). Further, it is preferred that the resin composition comprises an epoxy resin and has an average epoxy functionality of greater than 2.0.

The value of tan $\delta$ is determined for purposes of the present invention using a Rheometrics Scientific RDA-II or comparable instrument, operated in the oscillation mode using parallel plates with a diameter of 40 mm and a gap of between 0.5 and about 1 mm. Strain is set at 40% and torque is adjusted within the range of 5 to 1200 g•cm (0.49–117.7 mN•m). Frequency is 10 rad/s (1.59 Hz). Those skilled in the art will recognize that the critical parameters are the oscillation frequency and strain. The other parameters can be adjusted to provide identical measurement conditions using different geometries (and/or using different instruments which operate on the same principle). Measurements are taken within the temperature range of 70 to 1 40° C. at a heating rate of 2° C./min.

It has been discovered in accordance with the present invention that, when the prepreg of the present invention made with an epoxy resin composition having a tan $\delta$ value within the ranges as defined above, the porosity in the finished composite structure prepared from the prepreg is reduced as compared to that in a sandwich structure manufactured from a prepreg prepared with a conventional epoxy resin. As used herein, porosity refers to the percentage of the area occupied by the pores or voids in a cross section of a finished fiber reinforced composite panel based on the total area of the cross section. Generally, porosity includes all pores or voids formed in cured laminates of the finished fiber reinforced composite structure, both in the inter-ply zones, i.e., the zones between plies, and the intra-ply zones, i.e., the zones within one cured prepreg ply.

As will be apparent to the skilled artisan, in the resin composition of the present invention, the tan δ and the flow rate can be controlled by many different methods. For example, they can be controlled by varying the types and relative content of the solid and/or liquid elastomers, and the extent of the epoxy-elastomer reaction, i.e., the selection of the types and extent of functional groups of the solid or liquid elastomers capable of reacting with the epoxy resins in the resin composition and/or by selection of resin and curing compositions having appropriate viscosities.

The hardenable resinous material can be applied to the fabric using any conventional method known in the art. For example, the resin can be applied by a solvent method or a solventless method, both of which are known in the art. In the solvent method, which is also known as tower method or wet method, the prepreg is prepared by impregnating the fabric with the resin composition that is dissolved in an appropriate solvent. For example, a resin composition can be dissolved in a solvent in a resin tank and applied to a fabric as the fabric passes through the solution in the tank. In a solventless method (also known as hot-melt method), the resin is formed into a resin film on an appropriate substrate and is subsequently transferred onto the fabric by heat and pressure. For example, a solvent free polymeric resin system is prepared and a paper substrate is coated with a resin film from the polymeric resin. A prepreg is then prepared by transferring resin films from two paper substrates onto the top and bottom surfaces of a fabric, while two resin films sandwiching the fabric are heated and consolidated.

The resin should be applied to the fabric such that the fabric is substantially impregnated. The resultant prepreg should have a resin content of from about 20 to about 60 percent by weight, preferably about 30 to about 50 percent by weight, more preferably about 35 to about 45 percent by weight, and most preferably about 38–42 percent by weight, based on the total weight of the prepreg. The prepreg thus prepared can then be wound onto a roll or the like for storage or shipping. Optionally, the prepreg can be subjected to various post-impregnation treatments. For example, as is known in the art, the prepreg can be polished (which is also known as being "calendered" or "subjected to "compaction") to make the surface of the prepreg more even and to reduce the openness of the prepreg. Typically, a prepreg can be polished by pressing the prepreg under a pressure of about 40 to 80 psi at a temperature of about 120–160° F.

Figure 2:
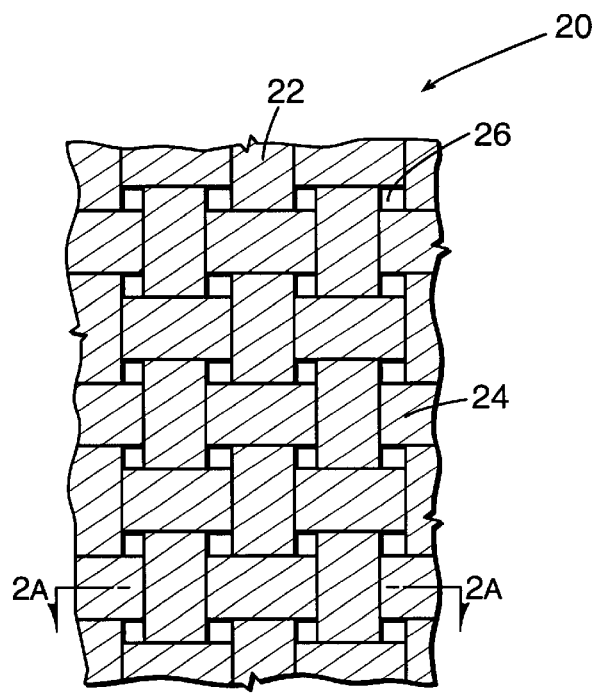
FIG. 2 illustrates a prepreg prepared from the woven fabric of FIG. 1 by resin impregnation thereof.
Figure 2A:
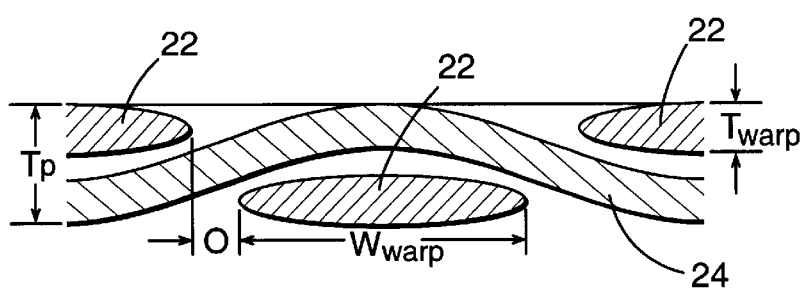
FIG. 2A is a diagrams illustrating the cross section of the prepreg of FIG. 2 taken along the line 2A—2A thereof and illustrates the thickness of the prepreg and the aspect ratio of the tows along one direction of the prepreg.

FIG. 2 illustrates a prepreg made by impregnating a fabric of FIG. 1 with a resin composition. FIG. 2A is a diagram showing the cross sectional view of the prepreg of FIG. 2 taken along a weft tow strand 24 (line 2A). As indicated in FIG. 2A, the prepreg has a maximum thickness $T_p$. The warp tow strand 22 has a maximum tow width $W_{warp}$ and a maximum tow thickness of $T_{werp}$. Likewise, the weft tow strand 24 also has a maximum tow width $W_{weft}$ and a maximum tow thickness of $T_{weft}$ (not shown). The distance o between two adjacent warp tow strands 22 indicates one dimension of the opening 26 formed by two adjacent weft tow strands 24 and two adjacent warp tow strands 22.

Figure 2B:
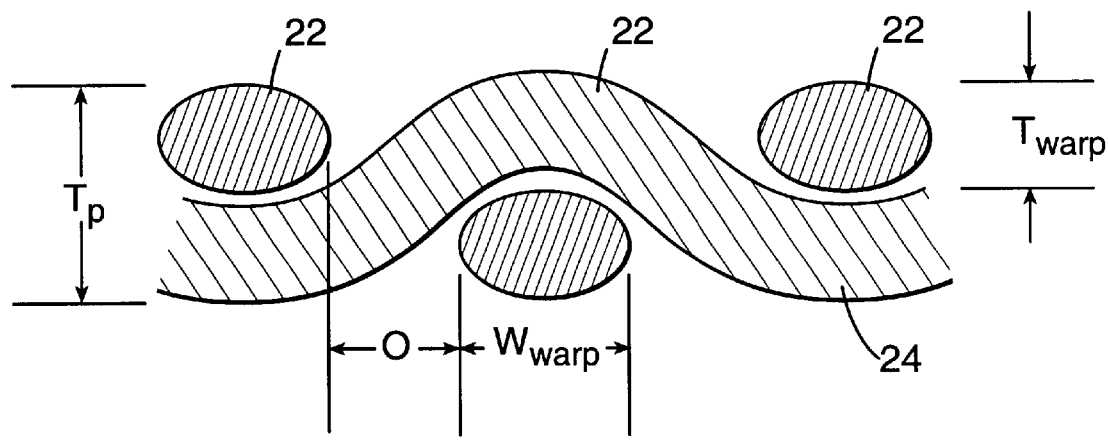
FIG. 2B illustrates the cross section of a prepreg taken along the center line of a tow strand along one direction of a prepreg demonstrating the thickness of the prepreg and the predetermined substantially stable round cross sectional shape as well as the tow aspect ratio of the tow strands along the other direction of the prepreg.

As used herein, "tow aspect ratio" of a prepreg is defined to be the ratio between the maximum cross sectional width of a tow strand, W, and the maximum cross sectional thickness of the tow strand, T, as measured in a prepreg, that is, W/T. It should be understood that tow aspect ratio is affected by the various steps in, e.g., tow manufacturing, fabric preparation from tows, prepreg manufacturing from the fabric, the post-impregnation treatment of the prepreg, as well as the steps in the preparation of composite sandwich structures from the prepreg. Typically, a generally round tow (See FIG. 2B) in a prepreg will have a low tow aspect ratio. Conversely, a tow that is flattened during the manufacturing processes will have a large tow aspect ratio. As used herein, the term "prepreg average tow aspect ratio" is the average of the tow aspect ratio of the warp tow strands and the weft tow strands in the prepreg. Typically, measurements taken from at least 25 to 50 different tows in each direction should be used in arriving at the average tow aspect ratio of a prepreg. Likewise, the term "average tow aspect ratio in one direction" refers to the average tow aspect ratio of the tow strands in one direction of a two-dimensional woven fabric.

In accordance with this invention, different methods can be used to manipulate or modify the cross sectional tow shape, and therefore the tow aspect ratio of a fiber tow strand of a prepreg following weaving, impregnation and optionally post-impregnation treatment. Examples of such methods include, but are not limited to, sizing the tows prior to weaving, tow twisting, tow twisting and untwisting, varying the cross sectional shapes of the individual filaments in the tows and/or employing various other modifications of the tow forming process.

It has been found that irregularities in cross sectional shapes of the individual fibers or filaments in the tow can increase the entanglement of the filaments and reduce tow aspect ratio. In particular, filaments having specific cross sectional shapes can be selected to vary the tow aspect ratio. For example, it has been found that individual filaments having a kidney or pea shape in cross section will generally form a rounder fiber tow having a smaller aspect ratio following weaving and impregnation as compared to an otherwise identical tow in which each filament has a round cross section.

Another method for modifying the tow construction and tow aspect ratio is by twisting and/or twisting untwisting the tow to a desired extent. Twisting processes are well known in the art. As used herein, a "twisted tow" means a tow that is subjected to a twisting process during the tow forming but which is not subjected to an untwisting process as described below. Typically, twisted tows have a rounder shape and thus a smaller fiber tow aspect ratio following weaving. The degree of twisting, i.e., the number of turns per unit length, can vary with the shape, or tow aspect ratio desired. For example, twisted carbon fiber tows having about 15 twists per meter are generally available and can be used in this invention. An "NT" tow, that is, a tow that is never twisted, can also be used in this invention. "Untwisted" tows or "UT" tows can be formed by first twisting a filament bundle to a desired degree and then untwisting, i.e., winding the twisted fiber filament bundle or tow in the opposite direction, to a desired degree. Typically, NT tows have a relatively flatter tow shape and thus a relatively larger tow aspect ratio as compared to both twisted tows and UT tows.

Twisting or untwisting can be done either before or after the carbonization of the precursor filaments as will be apparent to those of skill in the art. Different procedures can be used. For example, precursor filaments can be carbonized after twisting, and then untwisted thereafter. Alternatively, a precursor filament bundle can be carbonized in the never twisted condition. Thereafter, twisting can be optimally performed on the carbonized tow, as desired.

Another method of arriving at a desired cross sectional shape of a tow strand is by sizing the tow. As is known in the art, sizing refers to a process which includes coating or impregnating a tow with a sizing agent, and drying the sizing agent, thus fixing or substantially fixing the shape of the cross sectional shape of the tow. Any conventional sizing agents can be used. Preferably, an epoxy-based or epoxy-compatible sizing agent is used. As is known in the art, an epoxy-based sizing agent may optionally contain, e.g., a weak epoxy resin, and additives such as polyethylene glycol, water-soluble polyurethane resin, polyvinyl formal resin, nonionic surfactant and/or a cationic surfactant. Various drying methods can be used after the sizing agent is applied, including, e.g., drum drying, air drying, and air blowing. It is noted that drying methods may also affect the cross sectional tow shape and, thus the tow aspect ratio. Typically, sizing is done after the carbonization process.

In addition, a predetermined, substantially stable cross sectional shape can be imparted to the tow by passing the tow during the tow preparation process, through a specially designed shaping die. The shape of the die can be designed to be the shape of the desired tow cross section. Prior to contacting the tow with the die, the tow can be subjected to a sizing operation so that the shaping operation will substantially fix the cross sectional shape of the tow.

In order to achieve a particular fiber tow construction or shape and a particular fiber tow aspect ratio, different methods can be utilized individually or in various combinations. Some minor degree of experimentation may be required to determine which method or combination of methods is most effective, this being well within the capability of one skilled in the art once apprised of the present disclosure. For example, sizing operation can be performed on twisted, NT or UT tows. In preparing an UT tow, sizing can be done either before the twisting, after the twisting but before the untwisting, or after the twisting, or in various combinations thereof.

As used herein, "prepreg openness" refers to the percentage of the area in the prepreg which corresponds to the openings in the prepreg, e.g., openings 26 in FIG. 2. Such openings result from the openings of the fabric used in the prepreg, as indicated by openings 16 in FIG. 1. However, it should be understood that the prepreg openness can be different from the openness of the fabric used in making the prepreg. Typically, when the resin used in the prepreg is transparent, prepreg openness corresponds to the percentage of the area through which light can transmit. Thus, the extent of prepreg openness can readily be determined by optical inspection and measurements as detailed hereinafter.

Referring back to FIG. 2A, the maximum thickness $T_p$ represents the maximum thickness in the area where a warp tow strand 22 intersects and floats over a weft tow strand 24. Generally, in measuring the thickness of a prepreg, a thickness gauge with a presser foot covering a relatively large area, e.g., one square inch, is used. As used herein, the term "prepreg thickness" means the average of at least 25–50 thickness measurements taken in different representative areas of a prepreg.

For purposes of the present invention, the measurements to determine prepreg thickness, openness, and prepreg tow aspect ratio are taken after the sample prepregs have been subjected to a conditioning treatment according to which the prepreg samples are subjected to a compacting pressure of about 45 psi at a temperature of 160° F. for about three minutes. The compacting pressure is exerted using a pneumatic-driven hot press, which contains two parallel platens with heating elements inside controlled by a temperature controller. The up-and-down movement of these two platens is driven by air pressure controlled by an air regulator. This conditioning treatment is performed in order to generate uniform characteristics of the prepreg being tested. In addition, it is intended to simulate the conditions that a prepreg is subjected to during the curing process for making a fiber reinforced composite structure.

In accordance with the present invention, it has been discovered that when a prepreg is used in a fiber reinforced composite structure, a number of prepreg properties are related to the degree of core crush of the composite structure. In particular, it has been discovered that three properties of a prepreg, namely the prepreg thickness, prepreg openness and the average tow aspect ratio of a prepreg, either individually or in combination, are highly determinative the degree of core crush. While not wishing to be bound by any theory, it is believed that such prepreg properties contribute to the roughness of the prepreg surface and thus the friction force between prepreg plies in the lay-up laminates during the curing process for making a composite sandwich structure. An increase in roughness and thus friction force leads to the reduction in the degree of core crush. As used herein, the "degree of core crush" is defined as the percentage of the area in the sandwich structure crushed during the curing process as discussed below in detail in connection with the method for testing a prepreg in a core crush panel.

In particular, it has been found that for prepregs made with fabrics having the same areal weight, i.e., basis weight, when the prepreg thickness is greater, the degree of core crush is lower. It has also been discovered that when the prepreg openness is increased, the degree of core crush is reduced. Further, the smaller the average fiber tow aspect ratio of a prepreg, the lower the degree of core crush that is observed.

Thus, in accordance with the first embodiment of the present invention, a prepreg is provided which when used in a fiber reinforced composite structure, greatly reduces the degree of core crush. In particular, when the prepreg of this invention is used in making a fiber reinforced composite structure, the degree of core crush is preferably no greater than about 15%, more preferably no greater than about 10%, and most preferably no greater than about 5%.

In accordance with the first embodiment, the prepreg of this invention has a prepreg openness of, at least about 1.0%, preferably at least about 2.0%, more preferably at least about 2.5%, even more preferably at least about 3.0%, and most preferably at least about 3.8% as determined by the optical inspection method described hereinafter. However, typically the prepreg openness will be less than about 10.0%, more preferably, less than about 6.0%.

The prepreg has a prepreg thickness of at least about 0.220 mm, preferably at least about 0.245 mm, more preferably at least about 0.250 mm, more preferably at least about 0.260, even more preferably at least about 0.265 mm, and most preferably at least about 0.270 mm.

Alternatively, the prepreg average tow aspect ratio is less than about 15.5, preferably less than about 14.0, more preferably less than about, 13.0, even more preferably less than about 12.5, and most preferably less than about 11.5.

It is noted that in this embodiment of the prepreg of this invention, the prepreg will have at least one of the above-described three properties. That is, at least one of the three properties of the prepreg, namely prepreg openness, prepreg thickness, and prepreg tow aspect ratio falls with the corresponding range as described above. Preferably at least two of the above three requirements are met in this embodiment of the invention. Most preferably, all three requirements are met by the prepreg.

The prepreg in accordance with this first embodiment of the present invention can be prepared by the methods as described in detail above. Typically, different fabrics may be impregnated with a resin composition as described above to prepare a prepreg. The properties of the prepreg, namely, prepreg openness, prepreg thickness, and average tow aspect ratio are measured and compared with the above-defined ranges.

In accordance with the second embodiment of the prepreg of this invention, a fabric having a complex weave is used in the prepreg to reduce both core crush and porosity. The fabric is of the same type as the fabric 10 generally described above, i.e., a two-dimensional woven fabric, preferably a biaxially woven fabric with the warp tow strands crossing the weft tow strands at a substantially right angle. However, for purpose of this second embodiment of the present invention, the tow strands in one direction, e.g., warp or weft, have a different tow construction and a different tow aspect ratio, from the tow strands in the other direction, e.g., weft or warp. By "different tow construction" it is intended to mean that the tow strands in the two directions are different in nature, i.e., they are formed either from different fiber filaments or by different tow manufacturing processes, or through manipulation of the weaving processes, or a combination of these processes. For example, the tow strands in one direction can be twisted tows while the tow strands in the other direction being never twisted (NT) tows. In another example, the tow strands in one direction can have a total filament count of about 3,000 while those in the other direction having a total filament count of, e.g., from about 4,000 to about 12,000. Since the average tow aspect ratios of the tow strands in the two different directions are different in this embodiment of the invention, the tow strands in the two directions typically have different cross sectional shapes or dimensions. For example, tows in one direction can be rounder and the tows in the other direction can be flatter, as is apparent from the above detailed description related to tow aspect ratio.

While not wishing to be bound by any theory, it is believed that large openness may cause a large amount of voids to form in the cured prepreg plies of a composite sandwich structure due to air bubbles trapped within the plies during the curing process. In addition, it is believed that when prepreg thickness is increased, porosity may be increased due to the weave peak/valley mismatches between adjacent prepreg plies. It is also believed that when prepreg average aspect ratio is too small, prepreg openness can be great enough so as to exacerbate the porosity problem. It has been found that prepreg openness correlates, to some extent, to porosity, and prepreg openness can be indicative as to the degree of porosity. Again while not wishing to be bound by any theory, it is believed that, because hybrid tows are employed in the second embodiment of the present invention, the friction force between the prepreg plies is increased as compared to the conventional prepregs known heretofore in the art, while the prepreg openness can be kept low. Thus, in a fiber reinforced composite structure prepared with a prepreg of this embodiment, both core crush degree and porosity are low.

Figure 3:
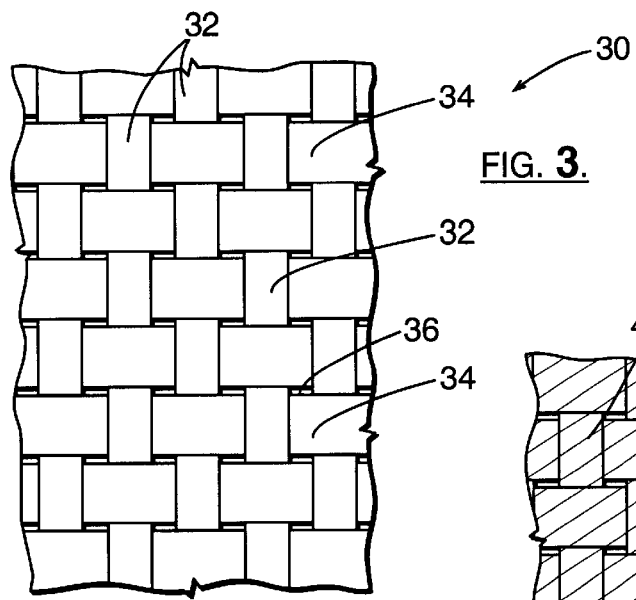
FIG. 3 illustrates a woven fabric for use in the prepreg of this invention in which the weft tows have a different tow construction and aspect ratio as compared to the warp tows.
Figure 4:
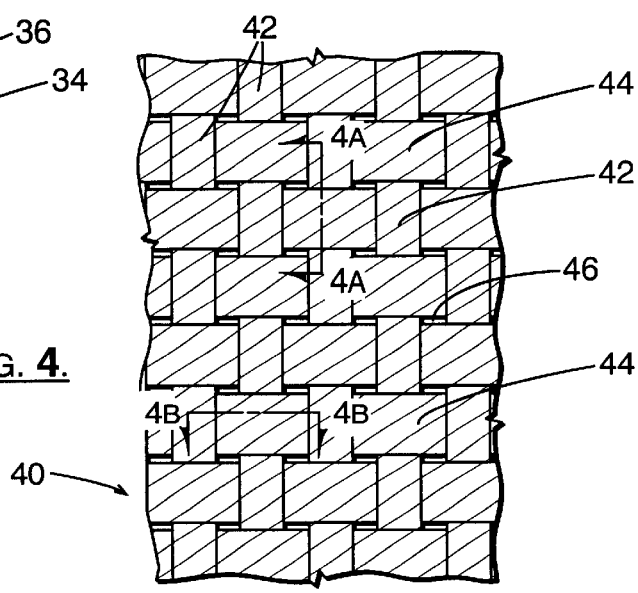
FIG. 4 illustrates a prepreg made from the woven fabric of FIG. 3.

FIGS. 3 illustrates the fabric design of a woven fabric 30, which is an example of the suitable fabrics for use in the prepreg of the second embodiment of this invention. FIG. 4 shows a prepreg 40 made by impregnating fabric 30 with a hardenable resin composition. Fabric 30 is of the same type as fabric 10 shown in FIG. 1. As illustrated in FIGS. 3, 4, and FIGS. 4A and 4B, which are cross sectional views along 4A–4A and 4B–4B in FIG. 4 respectively, the weft tow strands 34 and 44 have a different cross sectional tow shape from the warp tow strands 32 and 42.

Figure 4A:
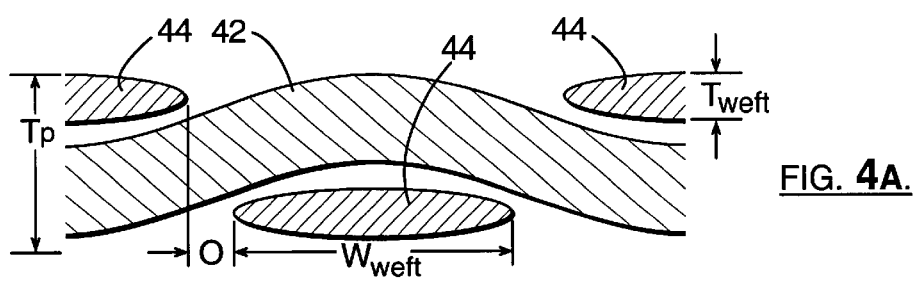
FIG. 4A illustrates the cross section of the prepreg of FIG. 4 taken along the line 4A—4A and illustrates the tow aspect ratio in a first direction.
Figure 4B:
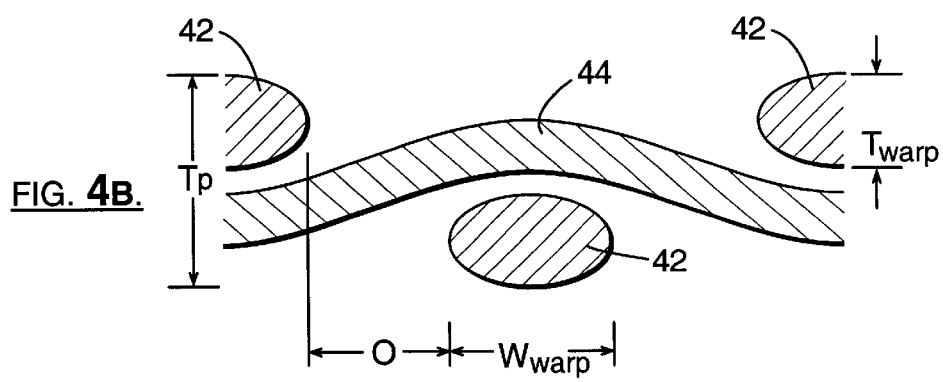
FIG. 4B illustrates the cross section of the prepreg of FIG. 4 taken along the line 4B—4B and illustrates the tow aspect ratio in the other direction.

Referring now to FIG. 4A, in the prepreg 40, the weft tow strands 44 have a maximum tow width $W_{weft}$ and a maximum tow thickness $T_{weft}$. Therefore, weft tow strands 44 have a fiber tow aspect ratio $W_{weft}/T_{weft}$. Likewise, as shown in FIG. 4B, warp tow strands 42 have a maximum tow width $W_{warp}$ and a maximum tow thickness $T_{warp}$, and thus a fiber tow aspect ratio $W_{warp}/T_{warp}$.

In accordance with this aspect of the present invention, the average tow aspect ratio of the tow strands in one direction is no greater than about 13.0, preferably no greater than about 12.5, more preferably no greater than about 12.0, most preferably no greater than about 11.0, while the average tow aspect ratio of the tow strands in the other direction being at least about 13.5, preferably at least about 14.0, more preferably at least 14.5, and most preferably at least about 15.5.

In addition, the prepreg according to the second embodiment preferably has a prepreg openness of no greater than about 5.0%, more preferably no greater than about 4.0%, even more preferably no greater than about 3.5%, and most preferably no greater than about 3.0%.

It is also preferred that the prepreg of this second embodiment has a prepreg thickness of from about 0.230 mm to about 0.300 mm, preferably from about 0.240 mm to about 0.290 mm, more preferably from about 0.250 mm to about 0.280 mm, most preferably from about 0.260 mm to about 0.270 mm.

In this embodiment of this invention, the fiber tow strands in both warp and weft directions can have the same filament count in each fiber tow strand. Alternatively, the filament counts for the tow strands in two directions can be different, e.g., about 3,000 in one direction which has the lower average tow aspect ratio, and above 3,000 but no greater than about 18,000, preferably no greater than about 12,000 in the tow strands having the higher average tow aspect ratio. When the fiber filament counts are different in the two directions, preferably the tow strands having a greater tow aspect ratio have the greater fiber filament count.

As discussed above, there are different methods to manipulate fiber tow strands to arrive at the desired tow constructions and tow aspect ratios, all of the methods being applicable in this aspect of the present invention.

Unexpectedly, when this second embodiment of the prepreg of this invention is used in making a fiber reinforced composite structure, both the degree of core crush and the porosity can be low. Typically, the degree of core crush is less than about 15%, preferably less than 10%, and more preferably less than 5%. In the meantime, the porosity in the composite structure is low and is substantially within the satisfactory range for aviation use.

In accordance with yet another embodiment of the present invention, there is provided a prepreg which comprises in the resin-impregnated fabric, tow strands having a predetermined substantially stable, non-round cross sectional shape. Typically such tow strands have an average fiber tow aspect ratio of from about 8.0 to about 18.0, preferably from about 10.0 to about 16.0, even preferably from about 12.0 to about 14.5, more preferably from about 12.5 to about 14.0, even more preferably from about 13.0 to about 14.0, and most preferably from about 13.0 to about 13.5. In addition, the prepreg openness is preferably no greater than about 5.0%, more preferably no greater than about 4.0%, even more preferably no greater than about 3.0%, and most preferably no great than about 2.0%. Typically, the prepreg has a prepreg thickness of from about 0.240 mm to about 0.300 mm, preferaby from about 0.250 mm to about 0.275 mm, more preferably from about 0.255 mm to about 0.270 mm, and most preferably from about 0.260 mm to about 0.265 mm. It is noted that the prepreg properties can vary within the above ranges with tow strands having different filament counts. For example, if tows having a greater filament count, e.g., 12,000 are utilized, it is expected that the preferred prepreg thickness would be greater, e.g., at least 0.280 mm, and that the preferred openness would be, e.g., about 4.0%. It has been discovered that the prepreg in accordance with this third embodiment of the present invention can substantially reduce both core crush and porosity in fiber reinforced composite structures.

Figure 2C:
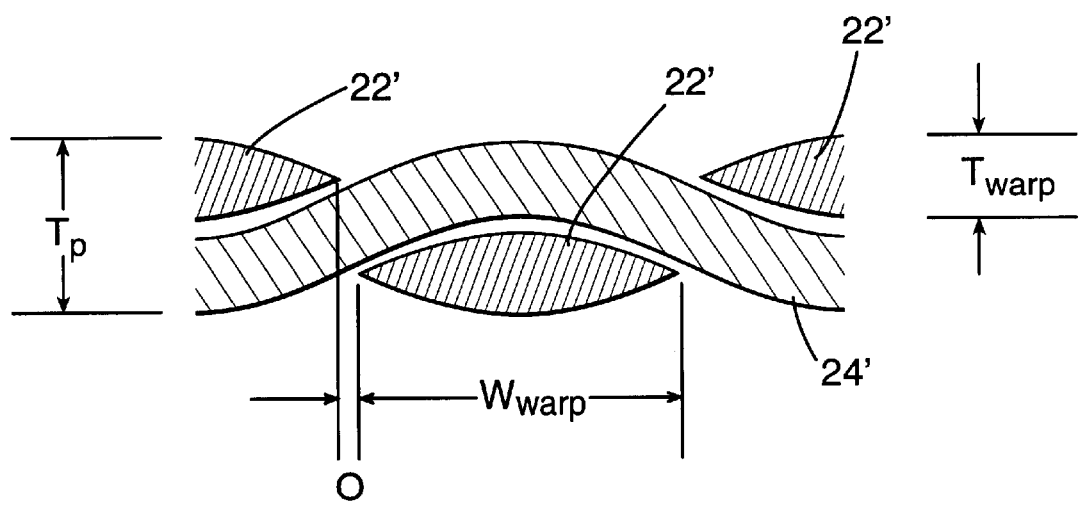
FIG. 2C illustrates the cross section of a prepreg taken along the center line of a tow strand along one direction of a prepreg demonstrating the thickness of the prepreg and the predetermined substantially stable non-round cross sectional shape as well as the tow aspect ratio of the tow strands along the other direction of the prepreg.

By "non-round cross sectional shape" it is intended to mean that the cross sectional shape of the tow strand is not round in that the cross-section includes one or more tip ends that taper to a generally pointed end, as opposed to the rounded ends and curved tapering of an oval or similar continuous round shape. Such non-round cross-section allows the tow to be sufficiently wide in shape and yet sufficiently thick near the tow centerline to achieve a high surface friction while reducing openness. Thus, two requirements should be met: first, in a given tow strand having a fixed total cross sectional area, the tow strand should be made such that a desired average tow aspect ratio within the above-described ranges is achieved. Second, the cross sectional tow shape should be arranged such that the greatest cross sectional width of the tow strand is substantially achieved while the desired average tow aspect ratio is complied with. Generally, so long as these two requirements are met, the cross section of the tow can be in any non-round shape. For example, as illustrated in FIG. 2C, the cross sectional shape of the tow strand 22 can be in an eye shape or spear shape, i.e., the two lateral tow tips along the width of the tow are substantially extended in the lateral direction, and are preferably sharply pointed ends, while the tow thickness at the center is nevertheless maintained at a certain desired level so as to meet the tow aspect ratio requirement as described above. To give another example, the cross sectional tow shape can be in a diamond shape. It is noted that the perimeter or circumference of the cross section of the tow strand need not be substantially smooth.

The cross sectional tow shape should be substantially stable. In other words, once the tow strands are formed, the cross sectional shape of the tow strands are substantially set and are maintained in the substantially same shape during the subsequent processes of, e.g., fabric preparation from tows, prepreg manufacturing from the fabric, the postimpregnation treatment of the prepreg, as well as the steps in the preparation of composite structures from the prepreg.

As is apparent from the discussion above in relation to the methods for modifying tow constructions and tow aspect ratio, many different methods, either individually or in various combinations, can be used to prepare a tow strand having a predetermined substantially stable non-round cross sectional shape. Without repeating the details as described above, such methods include, but are not limited to, extrusion tow strands through a specially designed die having the same shape as the desired cross sectional shape of the tow, sizing the tows prior to weaving, tow twisting, tow twisting and untwisting, varying the cross sectional shapes of the individual filaments in the tows, and various other modifications of the tow forming process.

Except for the special tow constructions and the prepreg openness requirement as specified above, the prepreg according to this embodiment is of substantially the same type as the prepreg illustrated in FIG. 2. FIG. 2C illustrates a cross sectional view of a prepreg in accordance with this third embodiment of the invention. It is noted that, as compared to the tow strands of the embodiment shown in FIG. 2B, while the tow thickness in FIG. 2C is comparable to that shown in FIG. 2B, the tow width of the tows in this third embodiment is substantially greater than that shown in FIG. 2B. As a result, the prepreg openness is reduced while the prepreg thickness is not substantially decreased.

In accordance with yet another embodiment of this invention, there is provided a method for evaluating the core crush resistance properties of a prepreg for use in a fiber reinforced composite structure. As described above, it has been discovered in accordance with this invention that the prepreg thickness, average tow aspect ratio, and prepreg openness of a prepreg used in the curing process for making a fiber reinforced composite structure all correlate with the degree of core crush during the curing process. Accordingly, the method for evaluating the core crush resistance property of a prepreg includes determining the prepreg thickness, the average tow aspect ratio and/or prepreg openness, and comparing the obtained results to a set of predetermined values. Typically, values for prepreg thickness, average tow aspect ratio, and/or prepreg openness corresponding to different core crush degrees are obtained with different types of fabrics and/or resins. Such values can then be used as "predetermined values." By comparing the values for prepreg thickness, average tow aspect ratio, and/or prepreg openness measured from a particular prepreg being evaluated to the predetermined values, the range within which the degree of core crush in a curing process using the prepreg will likely fall can be predicted. It is noted that the predetermined values can vary when substantially different fabrics and/or resins are used in preparing the prepreg. By "substantially different fabrics" it is intended to mean, e.g., substantially different areal weights are used, or made from different types of fibers having substantially different mechanical properties, etc. However, an ordinarily skilled artisan apprised of the present invention should be able to determine the "predetermined values" for prepregs made from any types of fabrics and/or resins.

By way of example, for prepregs made from woven fabrics having an areal weight of from about from about 150 to about 400 grams per square meter, preferably from about 150 to about 250 grams per square meter, more preferably from about 180 to about 205, most preferably from about 185 to 201 grams per square meter, and consisting essentially of carbon fiber tow strands impregnated with a hardenable resin, a set of predetermined values have been determined. The values for prepreg thickness and average fiber tow aspect ratio and the corresponding degree of core crush are shown in FIGS. 5 and 6.

Figure 5:
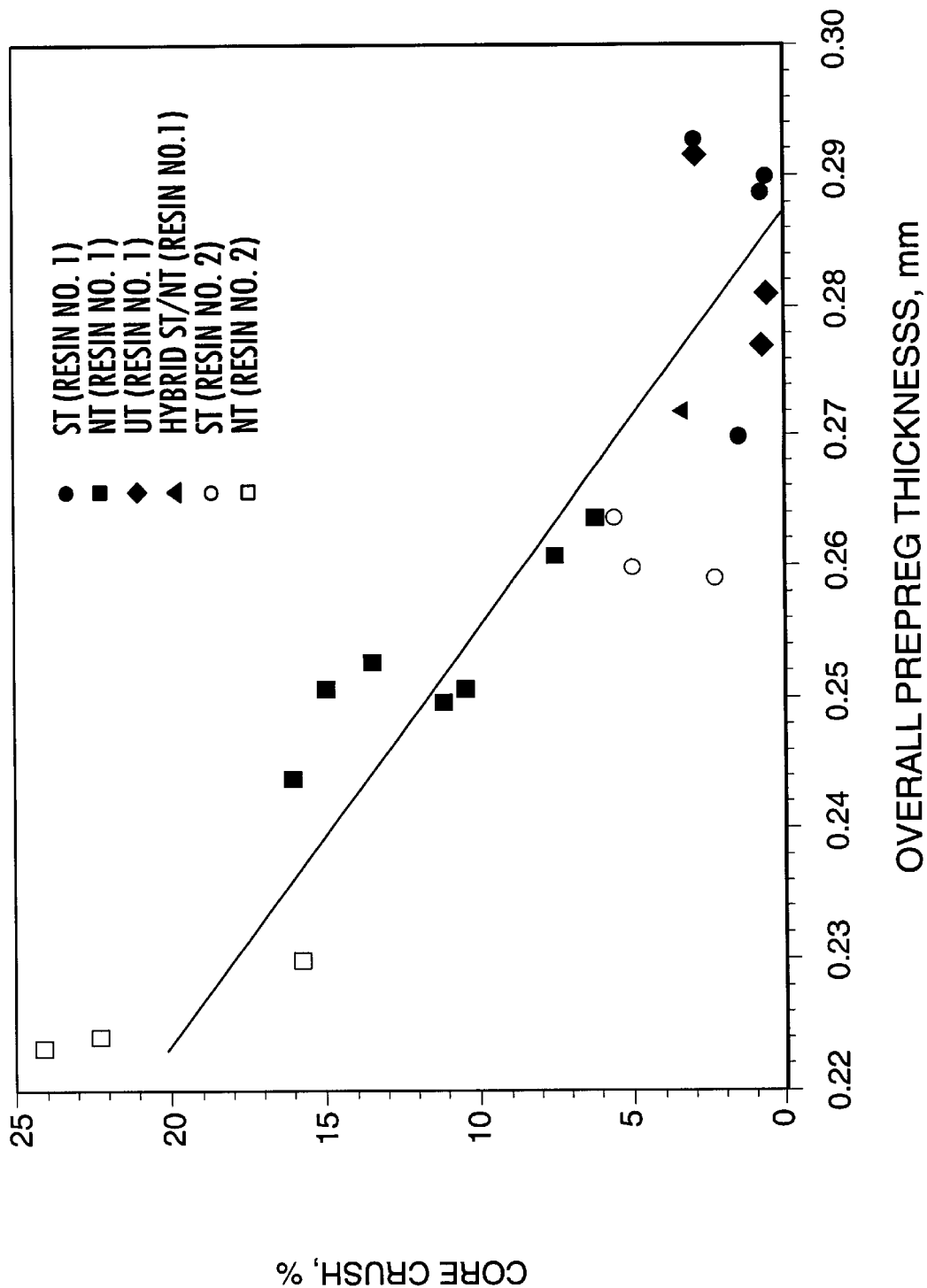
FIG. 5 is a graph illustrating the correlation between prepreg thickness and core crush degree in honeycomb core composite sandwich structures.
Figure 6:
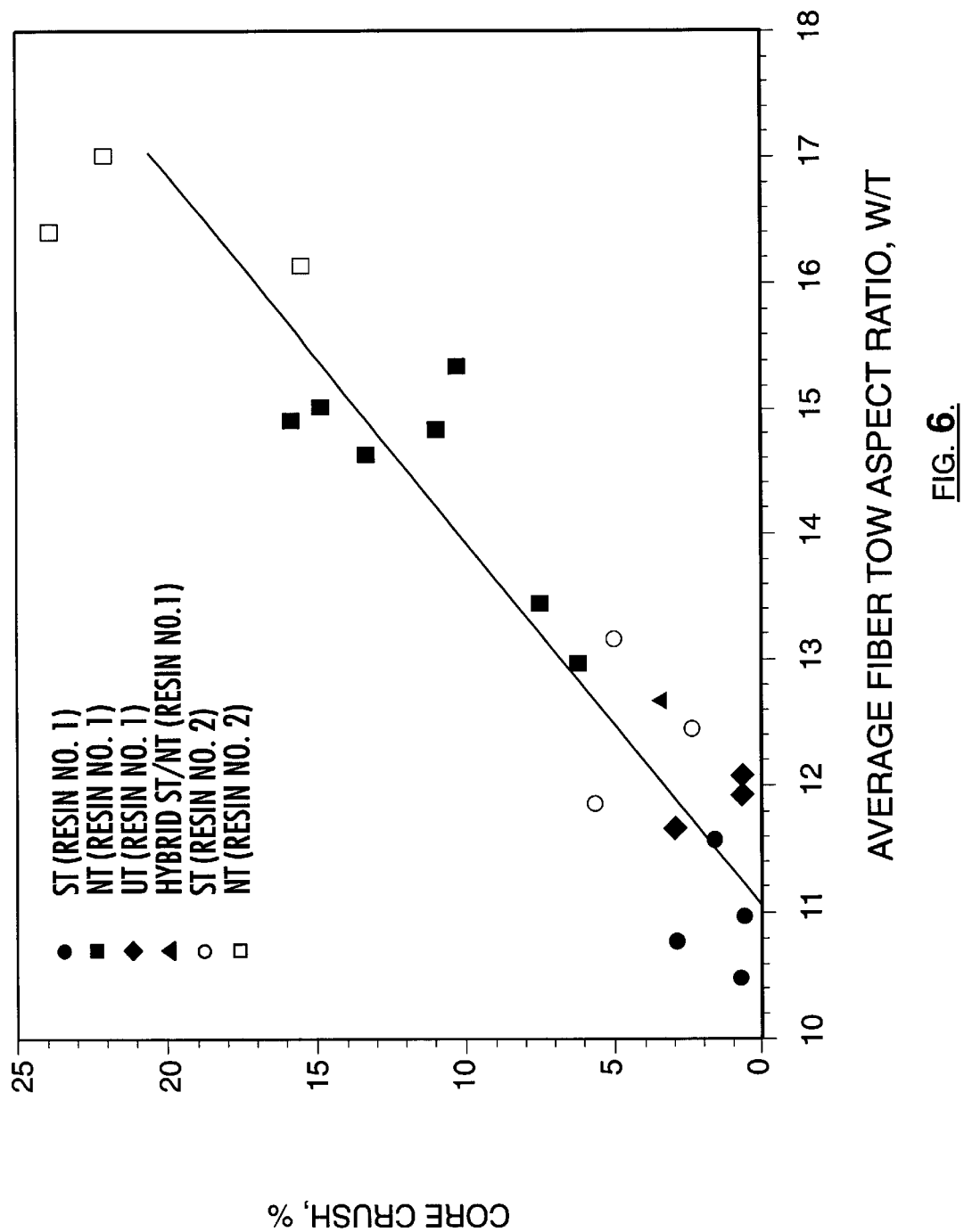
FIG. 6 is a graph illustrating the correlation between prepreg average fiber tow aspect ratio and core crush degree in honeycomb composite sandwich structures.

In FIGS. 5 and 6, plain weave fabrics having an areal weight in the range from about 185 to about 201 grams per square meter were prepared from different types of carbon fiber tows. The fabrics were impregnated with either of the two resin compositions described in Example 1 below. Partly because different fiber tows and different resins were used, the prepregs thus prepared had different prepreg thickness and average tow different aspect ratios. As illustrated in FIGS. 5 and 6, both prepreg thickness and average tow aspect ratio correlate with the degree of core crush. In FIGS. 5 and 6, ST stands for a prepreg made from a fabric prepared from carbon fiber tows which have a filament count of 3,000 and are twisted for 15 turns per meter; NT stands for a prepreg made from a fabric prepared from carbon fiber tows which have a filament count of 3,000 and are never twisted; UT stands for a prepreg made from a fabric prepared from carbon fiber tows which have a filament count of 3,000 and are twisted for 15 turns per meter before sizing and untwisted for 15 turns per meter after sizing; Hybrid ST/NT stands for a hybrid prepreg as described above prepared from a fabric having ST fiber tows in one direction and NT fiber tows in the other direction.

As an example, in a prepreg being evaluated, if the average fiber aspect ratio is no greater than about 13.5 and the prepreg thickness is more than about 0.260 mm, the core crush degree in a curing process using the prepreg can be predicted to be below about 10%. In addition, it has also been determined that when the prepreg openness is greater than about 3%, the core crush degree is normally below about 10%.

In the method of the present invention, although a value of only one of the three properties, namely prepreg average tow aspect ratio, prepreg thickness, prepreg openness, may be sufficient for predicting the core crush degree, it is preferred that the values for at least two of the three properties are determined and compared to the predetermined values, preferably one of the two being the prepreg average tow aspect ratio. More preferably, the values for all three properties are determined and compared to the predetermined values respectively. Although certain discrepancies may result from this method, generally the accuracy of the prediction based on this method can be above about 80%, especially when all three properties are examined. Thus, the method according to the present invention can be very useful in selecting core crush resistant prepregs for preparing fiber reinforced composite structures, especially those for aviation use.

In accordance with yet another embodiment of the present invention, a fiber reinforced composite structure is provided which is prepared using a prepreg of this invention as disclosed above. Fiber reinforced composite structures are well known in the art. Different methods for reducing core crush, e.g., various tiedown methods are known in the art in making the present reinforced composite structure of this invention using the prepreg provided in the present invention, advantageously the prior art methods and devices for reducing core crush can be omitted, and yet a core crush degree of less than about 15%, more preferably less than about 10%, and most preferably less than about 5% can be achieved. Of course, if it is desirable, those prior art devices, such as tiedown devices, for reducing core crush can also be used in making the fiber reinforced composite structure of this invention.

The fiber reinforced composite structure can be prepared by any suitable methods known in the art. Typically, plies of the prepreg of this invention are laid up in laminates on one or both sides of a lightweight core or honeycomb core formed of e.g., aluminum, Nomex®, fiberglass, etc. The lay-up is then autoclaved in a vacuum bag placed in an autoclave under conditions such that the prepregs are cured and adhered to the honeycomb core. For example, U.S. Pat. No. 5,685,940, which is incorporated herein by reference, discloses an improved method for making a fiber reinforced composite structure, which can be used in the present invention.

The invention is further demonstrated in the following examples, which are used only for purpose of illustration but not to limit the scope of the present invention.

In accordance with the invention, prepreg and composite properties are evaluated using the testing methods described below. It should be noted that in these methods, the measurements indicated herein for prepreg thickness, openness, and prepreg tow aspect ratio are taken after the sample prepregs have been subjected to a conditioning treatment according to which the prepreg sample is subjected to a compacting pressure of 45 psi using a pneumatic-driven hot press at 160° F. for three minutes. This conditioning treatment is performed in order to generate uniform characteristics of the prepreg being tested. In addition, it is intended to simulate the conditions that a prepreg is subjected to during the curing process for making a fiber reinforced composite sandwich structure.

Method of Measuring Prepreg Openness

A piece of prepreg is laid flat under a microscope with transmitted light passing through the prepreg from under. No force or pressure is applied on this prepreg. An image, showing the prepreg and its openness as black and very light gray respectively, is viewed by a video camera (attached to the microscope) which transmits the image in detail form to the image grabber of a PC computer. The image is then converted into a rectangular array of integers, corresponding to the digitized gray level of each picture element (pixel). An image analysis program such as Optimas 6.2, in the PC, or the like is used to process this digital image information and represents it in the form of a gray level histograms. This histograms summarizes the gray level content of the image. In this case two distinct groups, corresponding to the prepreg and openness, can be found in the histograms. These two groups can be easily separated by a simple thresholding process. The prepreg openness is thus obtained as the percentage ratio between the number of pixels corresponding to the group associated with openness and the total number of pixels in the image.

In order to obtain more accurate and representative results, openness is measured at a very low magnification (5× or under). Each image contains at least ten fiber tow strands in each direction. Several pieces of prepreg randomly chosen from different locations of a prepreg roll are measured, and an average is taken as the openness of the prepreg.

Method Of Measuring Prepreg Thickness

Typically, prepreg thickness is measured by a thickness gauge with presser foot covering a relatively large area on the prepreg surface. For example, a test setup similar to ASTM D1777-96 (Standard Test Method for Thickness of Textile Materials) is used. The apparatus contains a thickness gauge with a one inch square presser foot and a 5 pounds dead weight on it. This is equivalent to approximately 5 psi pressure applied to the specimen when a measurement is taken. Several pieces of prepreg are randomly chosen from different locations of a prepreg roll and several measurements are taken for each piece. The average of the all the measurements from one prepreg roll can be taken as the prepreg thickness.

Method of Measuring Fiber Tow Width and Thickness In Prepreg

The width of a fiber tow strand can be determined by the light-transmission method as described above for determining prepreg openness, except that high magnification is used in this case to increase the measurement resolution and fiber tow is magnified in such a way that its width covers most part of the image. The same image program (Optimas 6.2) is calibrated before measurement through an acquired image of a very fine ruler positioned at the same height as the measured object. By using the Optimas software to draw a line on a known dimension of the ruler, the programs can "memorize" the length of this line and use this information as a base for any other length measurements under the same condition. Fiber tow width is then measured by simply drawing a line to cover the entire fiber tow width and the programs can automatically calculate the length of this line based on the saved calibration data.

Again, several pieces of prepreg are randomly chosen from different locations of the prepreg roll and each piece has several measurements. Final number is based on the average of all measurements.

Similarly, to measure the fiber tow thickness, a piece of prepreg is carefully cut with surgical scissors along the centerline of fiber tows. The thickness is then determined in a method similar to that for measuring the width of a fiber tow strand. Again, no force or pressure is applied. Very high magnification is necessary in this case to increase the measurement resolution. Light sources can be positioned in such a way that the 90-degree layer becomes white in contrast to dark 0-degree layer for each measurement. Measurements are made again in both warp and fill directions.

Testing Prepregs in Core Crush Panels

Figure 7:
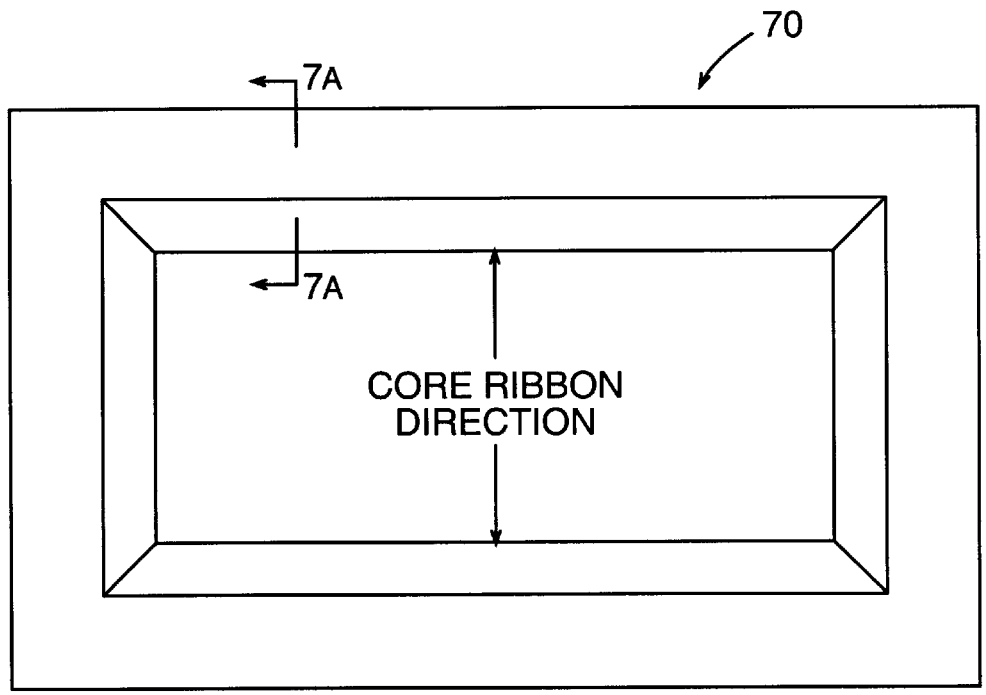
FIG. 7 is a diagram of a standard core crush panel used for testing the core crush properties of prepregs of this invention.
Figure 7A:
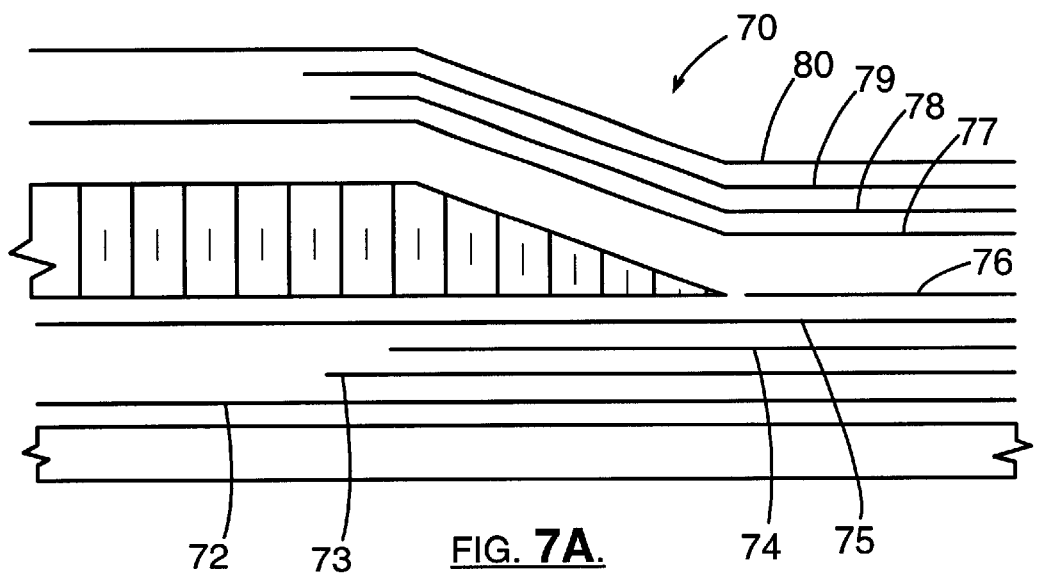
FIG. 7A is a cross sectional view of the core crush panel of FIG. 7 taken along the line A—A and illustrates the lay-up of the prepreg plies and the honeycomb core before curing.

A standard core crush panel 70 as shown in FIG. 7 is used consisting of 28"×24" composite skins and a 24"×20" Nomex aore (⅛ cell size, 0.5" thick, 3.0 pcf, e.g., Hexcel Corporation HRH-10, or equivalent) with a 200 chamfer angle. FIG. 7A is a cross section view of the core crush panel 70, illustrating the lay up of the core crush panel prior to being cured. The types, directions, and dimensions of prepreg plies, as well as those of the honeycomb core are specified in Table I. Additionally, layers of adhesive are typically between the core and prepreg plies 75 and 77, and below ply 72 (not shown).

TABLE I

| PLY NUMBER | TYPE | DIRECTION | DIMENSION |
| --- | --- | --- | --- |
| 72 | FULL | 0°–90° | 28" × 24" |
| 73 | DOUBLER | ±45° | 28" × 24" Picture-frame opening to allow 1.25" back from core mold point |
| 74 | DOUBLER | 0°–90° | 28" × 24" Picture-frame opening to allow 0.75" back from core mold point |
| 75 | FULL | ±45° | 28" × 24" |
| | CORE | TRANSVERSE | 20" × 24" 2.0" upper edge radius angle radius fair from 2.0" to 0.15" |
| 76 | FILLER | 0°–90° | 2 Pcs - 2" × 26" 2 Pcs - 2" × 24" |
| 77 | FULL | ±45° | 28.25" × 24.25" |
| 78 | DOUBLER | 0°–90° | 28.25" × 24.25" Picture-frame opening to allow 0.75" back from core mold point |
| 79 | DOUBLER | ±45° | 28.25" × 24.25" Picture-frame opening |

TABLE I-continued

| PLY NUMBER | TYPE | DIRECTION | DIMENSION |
| --- | --- | --- | --- |
| | | | to allow 1.25" back from core mold point |
| 80 | FULL | 0°–90° | 28.25" × 24.5" |

To cure the panel 70, the panel is placed in a vacuum bag. The vacuum bag and the panel therein are then placed in an autoclave. The bag is evacuated and cured under pressure at an elevated temperature. The curing cycle includes the following steps: (1) applying vacuum of 3.9 psia (27 kPa) minimum to the vacuum bag; (2) pressurize the autoclave to 413 kPa (45 psia) (including venting the vacuum bag to atmosphere when the autoclave pressure reaches 20 psia); (3) raising the temperature inside the autoclave at a rate of 1–5° F./min; (4) curing the panel at 355° F. for 2 hours (under the pressure established in step 2); (5) cooling down at a rate of 5° F./min, and (6) following curing, when part temperature has fallen to 140° F., relieving the pressure, removing the vacuum bag and debagging.

Figure 8:
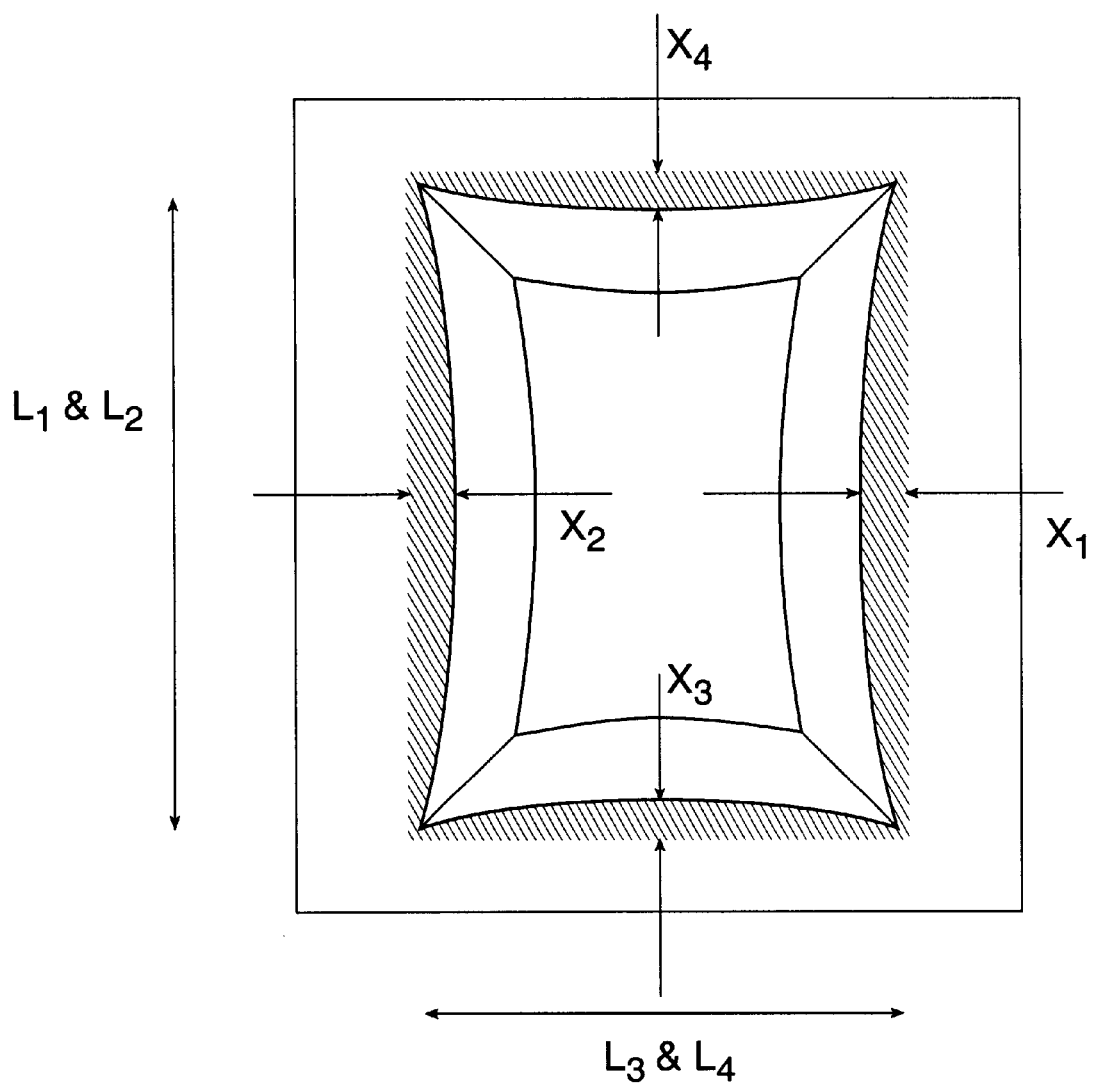
FIG. 8 is a diagram illustrating the determination of the core crush area in a standard core crush panel.

The dimensions of the cured core crush panel are measured as shown in FIG. 8. X is the displacement of the center of the core side from its original position. L represents the original length of core side. The crushed area A is calculated according to the formula:

$$A = \sum_{n=1}^{4} 2/3 \cdot X_n \cdot L_n$$

The degree of core crush in percentage is determined by the following formula:

Percent core crush=100×A/480.

To examine interlaminar porosity, a standard core crush panel is cut along the line marked 7A—7A in FIG. 7. The cross section is examined visually. One linear inch of the exposed edge in a ply area which appears to have the highest porosity is polished with a diamond polish (e.g., 0.3-micron diamond polish) and examined under 50× magnification for internal porosity. Five specimens are measured and an average is taken as the porosity.

In the following example, prepregs were made in accordance with the present invention. The sample prepregs were subjected to a conditional treatment: a compaction pressure of 45 psi was applied on the sample prepregs at 160° F. for three minutes to partially simulate the compaction imported to the panel in the autoclave during the curing process. The prepreg openness, thickness, and fiber tow aspect ratio were then measured from the sample prepregs. The prepregs were tested in a core crush panel for their core crush resistance and porosity.

EXAMPLE

Fabrics were prepared from ST (standard twisted), UT (untwisted), NT (never twisted) fiber tows, or both ST and NT fiber tows (Hybrid ST/NT, i.e., ST in warp direction and NT in weft direction) respectively. As used herein, ST tows stand for carbon fiber tows which were twisted for 15 turns per meter during the manufacturing process; NT tows are carbon fiber tows which were never twisted during the tow manufacturing process; UT tows are carbon fiber tows which were twisted for 15 turns per meter before sizing and untwisted for 15 turns per meter after sizing. Each tow had a total carbon fiber filament count of about 3,000. All fabrics used were plain weave with a weaving pitch of 12–13 tows/inch in both warp and weft directions, and had a fabric areal weight of about 193 grams per square meter.

The fabrics were impregnated by a solution method with either of the following two epoxy resin compositions: Resin No. 1 comprises of about 67% multifunctional epoxy resins, about 8.3% solid and liquid reactive elastomers, about 20.7% of a multifunctional amine curing agent, about 1.8% of a co-curing agent, 0.1% of a catalyst, and 2.1% of a flow control agent, i.e., fumed silica. The resin composition No. 1 has a tan δ of 0.78 at 70° C. and 0.27 at 140° C.

Resin No. 2 comprises of about 67.6% multifunctional epoxy resins, about 7.4% solid and liquid reactive elastomers; 20.7% of a multifunctional amine curing agents; about 1.8% of a co-curing agent; 0.1% of a catalyst, and 2.1% of a flow control agent, i.e., fumed silica. The resin composition No. 2 has a tan δ of 1.37 at 70° C. and 1.35 at 140° C.

The prepregs thus prepared were measured for prepreg thickness, openness, and fiber tow aspect ratio. Core crush panels were prepared from the prepregs and core crush degree and porosity were determined. The results are shown in Table II. Porosity is indicated qualitatively in a scale of 1 to 5, where 1 represents a low level while 5 corresponding to a high level.

Unexpectedly, when an epoxy resin such as the Resin No. 2 is used which has a preferred tan δ value and an average functionality of greater than 2, the porosity in the fiber reinforced composite sandwich structures prepared from the prepregs made from ST fabrics can be significantly reduced to an acceptable level, as shown in Table II. It is also believed that when the same resin is applied to a fabric made from UT tows, the porosity will be reduced as well. However, the use of a resin such as Resin No. 2 does not reduce core crush degree. For example, as shown in Table II, while the prepreg prepared from a fabric made from NT tows impregnated with Resin No. 1 causes unacceptable core crush, the same fabric impregnated with Resin No. 2 is associated with no less core crush.

Further, when a prepreg prepared from a hybrid fabric having ST tows in one direction and NT tows in the other direction is used, both core crush degree and porosity are satisfactory even when a conventional resin such as Resin No. 1 is used.

Thus, as demonstrated by the Example, the present invention provides prepregs which when used in making fiber reinforced composite structures, can effectively reduce both core crush and porosity. In addition, because various fiber tows can be manipulated to impart desirable prepreg properties so as to reduce core crush, this invention allows prepreg manufacturers greater freedom in selecting fiber tows or fabrics and thus less dependence on specific specialty fiber tow manufacturers.

TABLE II

| Fabric | Resin composition | Prepreg Thickness (mm) | Prepreg Openness (%) | Fiber Tow Aspect Ratio | | | Core Crush (%) | Porosity |
|---|---|---|---|---|---|---|---|---|
| | | | | Warp | Weft | Average | | |
| ST (comparative) | No. 1 | 0.289 | 4.9 | 8.8 | 11.9 | 10.4 | 0.73 | 5 |
| ST | No. 2 | 0.260 | 3.1 | 10.7 | 15.4 | 13.1 | 5.0 | 1–2 |
| UT (comparative) | No. 1 | 0.277 | 1.9 | 11.4 | 12.5 | 12 | 0.59 | 3 |
| NT (comparative) | No. 1 | 0.244 | 1.7 | 13.5 | 16.2 | 14.9 | 16 | 1 |
| NT (comparative) | No. 2 | 0.224 | 1.7 | 15.5 | 18.5 | 17 | 22.3 | 1 |
| Hybrid ST/NT | No. 1 | 0.272 | 3.8 | 9.7 | 15.5 | 12.6 | 3.4 | 3 |

As shown in Table II, when the prepreg thickness, average tow aspect ratio, and prepreg openness meet the requirements of this invention, the degree of core crush generally is low, i.e., lower than about 15%. For example, prepregs prepared from fabrics made from ST or UT fiber tows meet the prepreg thickness, average tow aspect ratio, and prepreg openness requirements, while those prepared from fabrics made from NT fiber tows do not meet the requirements. Consequently, as shown in Table II, the core crush degree in a fiber reinforced composite sandwich structure prepared using the former prepregs is substantially lower than that in a fiber reinforced composite sandwich structure prepared using the latter prepregs. Although prepregs made from plain weave fabrics prepared from ST, UT, and NT fiber tows having a filament count of 3,000 and impregnated with a conventional epoxy resin such as Resin No. 1 were known, the fact that prepreg openness, prepreg thickness and average tow aspect ratio are highly determinative of the core crush degree has never been appreciated. Accordingly, those skilled in the art prior to this invention generally expected the different tows to perform comparably.

In addition, while certain prepregs, e.g., prepregs prepared from fabrics made of ST tows, can reduce the degree of core crush, they are usually associated with unacceptable porosity. (See ST with Resin No. 1 in Table II.)

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A core crush resistant prepreg for use in making a fiber reinforced composite structure, comprising:

a woven fabric consisting essentially of carbon fiber tow strands impregnated with a hardenable polymeric resin composition;

said fabric having an areal weight of from about 150 to about 400 grams per square meter;

said resin composition having an average epoxy functionality of greater than 2.0, and a tan δ of between about 1.0 and about 2.0 at 70° C., between about 0.7 and about 2.0 at 100° C., and between about 0.5 and about 2.0 at 140° C. or the highest temperature of minimum resin viscosity; and said prepreg having an average fiber tow aspect ratio of less than about 15.5.

2. The prepreg of claim 1, wherein said prepreg has a prepreg openness of at least about 1.0%.

3. The prepreg of claim 1, wherein said fabric has an areal weight of from about 150 to about 250 grams per square meter.

4. The prepreg of claim 1, wherein said prepreg has an average fiber tow aspect ratio of less than about 14.0.

5. The prepreg of claim 1, wherein said prepreg has an average fiber tow aspect ratio of less than about 12.5.

6. The prepreg of claim 1, wherein said prepreg has a prepreg thickness of at least about 0.250 mm.

7. The prepreg of claim 1, wherein said prepreg has a prepreg thickness of at least about 0.270 mm.

8. The prepreg of claim 1, wherein said fabric has a plain weave pattern.

9. The prepreg of claim 1, wherein said fabric has a satin weave pattern.

10. The prepreg of claim 1, wherein each of said fiber tow strands has a total filament count of from about 1,000 to about 12,000.

11. The prepreg of claim 1, wherein each of said fiber tow strands has a total filament count of about 3,000.

12. The prepreg of claim 1, wherein said fiber tow strands are untwisted tow strands.

13. A core crush resistant prepreg for use in making a fiber reinforced composite structure, comprising:

a woven fabric consisting essentially of carbon fiber tow strands impregnated with a hardenable polymeric resin composition;

said fabric having an areal weight of from about 150 to about 400 grams per square meter;

said resin composition having an average epoxy functionality of greater than 2.0, and a tan δ of between about 1.0 and about 2.0 at 70° C., between about 0.7 and about 2.0 at 100° C., and between about 0.5 and about 2.0 at 140° C. or the highest temperature of minimum resin viscosity; and said prepreg having a prepreg openness of at least about 1.0% and a prepreg thickness of at least about 0.245 mm.

14. A core crush resistant prepreg for use in making a fiber reinforced composite structure, comprising:

a woven fabric having a plain weave pattern consisting essentially of carbon fiber tow strands impregnated with a hardenable polymeric resin composition comprising an epoxy resin;

said fabric having an areal weight of from about 180 to about 205 grams per square meter;

each of said tow strands having a total filament count of about 3,000;

said resin composition having an average epoxy fluctionality of greater than 2.0, and a tan δ of from about 0.5 to about 2.0 throughout the elevated temperature range of from about 70 to about 140° C.; and said prepreg having an average fiber tow aspect ratio of less than about 13.0, and a prepreg openness of from about 1.5% to about 10.0%.

15. A core crush resistant prepreg for use in making a fiber reinforced composite structure, comprising:

a woven fabric having a plain weave pattern consisting essentially of carbon fiber tow strands impregnated with a hardenable polymeric resin composition comprising an epoxy resin;

said fabric having an areal weight of from about 180 to about 205 grams per square meter;

each of said tow strands having a total filament count of about 3,000;

said resin composition having an average epoxy functionality of greater than 2.0, and a tan δ of from about 0.5 to about 2.0 throughout the elevated temperature range of from about 70 to about 140° C.; and said prepreg having an average fiber tow aspect ratio of less than about 13.0, a prepreg thickness of at least about 0.260 mm, and a prepreg openness of from about 1.0% to about 10%.

16. A core crush resistant prepreg for use in making a fiber reinforced composite structure, comprising:

a woven fabric consisting essentially of carbon fiber tow strands impregnated with a hardenable polymeric resin composition;

said fabric having an areal weight of from about 150 to about 250 grams per square meter;

said tow strands having a total filament count of from about 1,000 to less than about 3,000; and said prepreg having an average fiber tow aspect ratio of less than about 15.5, an average thickness of at least about 0.220 mm, and an openness of from about 1.0 percent to about 6.0 percent.

17. The prepreg of claim 16, wherein said resin has an average epoxy functionality of greater than 2.0, and a tan δ of from about 0.5 to about 2.0 throughout the elevated temperature range of from about 70 to about 140° C.

18. The prepreg of claim 16, wherein said prepreg has an average fiber tow aspect ratio of less than about 12.5.

19. The prepreg of claim 16, wherein said prepreg has a prepreg thickness of at least about 0.240 mm.

20. A core crush resistant prepreg for use in making a fiber reinforced composite panel structure, comprising:

a woven fabric consisting essentially of carbon fiber tow strands impregnated with a hardenable polymeric resin composition;

said fabric having an areal weight of from about 150 to about 400 grams per square meter;

said tow strands having a total filament count of greater than about 3,000 but no greater than about 18,000; and said prepreg having an average thickness of at least about 0.260 mm and an openness of at least about 1.5 percent.

21. The prepreg of claim 20, wherein said resin composition comprises an epoxy resin having an average epoxy functionality of greater than 2.0 and a tan δ of from about 0.5 to about 2.0 throughout the elevated temperature range of from about 70 to about 140° C.

22. The prepreg of claim 20, wherein said fabric has an areal weight of from about 150 to about 250 grams per square meter.

23. The prepreg of claim 20, wherein said prepreg has a prepreg thickness of at least about 0.280 mm.

24. The prepreg of claim 20, wherein said prepreg has a prepreg openness of from about 3.0 percent to about 10.0 percent.

25. A core crush resistant prepreg for use in making a fiber reinforced composite panel structure, comprising:

a woven fabric impregnated with a hardenable polymeric resin composition;

said woven fabric having an areal weight of from about 150 to about 400 grams per square meter and consisting essentially of a plurality of carbon fiber tow strands in a first direction interweaving with a plurality of carbon fiber tow strands in a second direction, said tow strands in said first direction having a different tow construction from said tow strands in said second direction;

wherein said prepreg has a tow aspect ratio of no greater than about 13.0 in said first direction and a tow aspect ratio of at least 13.5 in said second direction, and a prepreg openness of no greater than 5.0%.

26. The prepreg of claim 25, wherein said prepreg has a prepreg thickness of from about 0.240 mm to about 0.280 mm.

27. The core crush resistant prepreg of claim 25, wherein said tow aspect ratio in said first direction is no greater than about 11.0.

28. The core crush resistant prepreg of claim 25, wherein said tow aspect ratio in said second direction is at least about 15.5.

29. The core crush resistant prepreg of claim 25, wherein said prepreg has an openness of no greater than about 3.0%.

30. The core crush resistant prepreg of claim 25, wherein said tow strands in said first direction and said tow strands in said second direction have a fiber filament count of about 3,000.

31. The core crush resistant prepreg of claim 25, wherein said tow strands in said first direction have a fiber counts of about 3,000 and said tow strands in said second direction have a fiber filament count of about 6,000.

32. The core crush resistant prepreg of claim 25, wherein said tow strands in said first direction are twisted tows and said tow strands in said second direction are never twisted.

33. The core crush resistant prepreg of claim 25, wherein said tow strands in said first direction are untwisted tows and said tow strands in said second direction are never twisted.

34. The core crush resistant prepreg of claim 25, wherein said woven fabric has an areal weight of from about 150 to about 250 grams per square meter.

35. The core crush resistant prepreg of claim 25, wherein said resin composition comprises an epoxy resin.

36. The core crush resistant prepreg of claim 25, said resin composition has an average epoxy functionality of greater than 2.0, and a tan $\delta$ of from about 0.5 to about 2.0 throughout the elevated temperature range of from about 70 to about 140° C.

37. A core crush resistant prepreg for use in making a fiber reinforced composite structure, comprising:

a woven fabric impregnated with a hardenable liquid epoxy resin composition, said woven fabric having an areal weight of from about 185 to about 205 grams per square meter and consisting essentially of a plurality of carbon fiber tow strands in a first direction interweaving with a plurality of carbon fiber tow strands in a second direction, said tow strands in said first direction having a different tow construction from said tow strands in said second direction, wherein said prepreg has a tow aspect ratio of no greater than about 11.0 in said first direction and a tow aspect ratio of at least 15.5 in said second direction, a prepreg openness of no greater than about 3.0%, and a prepreg thickness of from about 0.250 mm to about 0.280 mm.

38. A core crush resistant prepreg for use in making a fiber reinforced composite structure, comprising:

a woven fabric consisting essentially of carbon fiber tow strands impregnated with a hardenable polymeric resin composition, said tow strands having a predetermined substantially stable non-round cross sectional shape;

said fabric having an areal weight of from about 150 to about 400 grams per square meter;

said prepreg having an average tow aspect ratio of from about 8 to about 18, and a prepreg openness of no greater than about 5.0%.

39. The prepreg of claim 38, said average tow aspect ratio is from about 12.0 to about 14.5.

40. The prepreg of claim 38, wherein said prepreg has a prepreg average thickness of from about 0.240 mm to about 0.300 mm.

41. The prepreg of claim 38, wherein said cross sectional shape is a diamond shape.

42. The prepreg of claim 38, wherein said cross sectional shape is a spear shape having two pointed ends.

43. The prepreg of claim 38, wherein each of said tow strands has a total fiber filament count of from about 1,000 to about 18,000.

44. The prepreg of claim 38, wherein each of said tow strands has a total fiber filament count of about 3,000.

45. The prepreg of claim 38, wherein said fabric has an areal weight of from about 150 to about 250 grams per square meter.

46. The prepreg of claim 38, wherein said fabric has a plain weave pattern.

47. The prepreg of claim 38, wherein said fabric has a satin weave pattern.

48. The prepreg of claim 38, wherein said resin composition comprises a multifunctional epoxy resin having an average epoxy functionality of greater than 2.0, and a tan $\delta$ of from about 0.5 to about 2.0 throughout the elevated temperature range of from about 70 to about 140° C.

49. A core crush resistant prepreg for use in making a fiber reinforced composite structure, comprising:

a woven fabric consisting essentially of carbon fiber tow strands impregnated with a hardenable polymeric resin composition comprising an epoxy resin, said tow strands having a predetermined substantially stable non-round cross sectional shape and a filament count of about 3,000;

said fabric having an areal weight of from about 180 to about 205 grams per square meter;

said prepreg having an average tow aspect ratio of from about 12.5 to about 14.0, a prepreg openness of no greater than about 3.0%, and a prepreg thickness of from about 0.250 mm to about 0.280 mm.

50. A core crush resistant prepreg for use in making a fiber reinforced composite structure, comprising:

a woven fabric consisting essentially of carbon fiber tow strands impregnated with a hardenable polymeric resin composition;

said fabric having a satin weave pattern and an areal weight of from about 150 to about 250 grams per square meter; and said prepreg having an average fiber tow aspect ratio of less than about 15.4, a prepreg thickness of at least about 0.245 mm, and a prepreg openness of from about 1.2% to about 6%.

51. A core crush resistant prepreg for use in making a fiber reinforced composite structure, comprising:

a woven fabric consisting essentially of carbon fiber tow strands impregnated with a hardenable polymeric resin composition;

said fabric having a twill weave pattern and an areal weight of from about 150 to about 250 grams per square meter; and said prepreg having an average fiber tow aspect ratio of less than about 15.4, a prepreg thickness of at least about 0.245 mm, and a prepreg openness of from about 1.2% to about 6%.

* * * * *